(12) United States Patent
Rathweg

(10) Patent No.: US 6,311,915 B1
(45) Date of Patent: Nov. 6, 2001

(54) BUCKLER FOR A TAPE DRIVE

(75) Inventor: Christopher Rathweg, Lafayette, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/595,426

(22) Filed: Jun. 15, 2000

Related U.S. Application Data

(63) Continuation-in-part of application No. 09/276,330, filed on Mar. 25, 1999, now Pat. No. 6,092,754, which is a continuation-in-part of application No. 09/149,759, filed on Sep. 8, 1998, now Pat. No. 5,971,310.

(51) Int. Cl.[7] ....................................... G03B 1/38
(52) U.S. Cl. ................. 242/332.4; 242/338; 242/532.1; 242/532.6; 242/532.7; 242/582
(58) Field of Search ............................. 242/332.4, 332.7, 242/332.8, 532.1, 532.6, 532.7, 582, 352.4, 338, 339, 337; 360/93, 96.5, 99.02, 99.03

(56) References Cited

U.S. PATENT DOCUMENTS

| | | | |
|---|---|---|---|
| 4,330,096 | * | 5/1982 | Bartel et al. . |
| 4,577,811 | * | 3/1986 | Bray et al. . |
| 4,608,614 | * | 8/1986 | Rinkleib et al. . |
| 4,646,177 | * | 2/1987 | Sanford et al. . |
| 4,720,913 | * | 1/1988 | Hertrich . |
| 4,832,284 | * | 5/1989 | Inoue . |
| 5,046,168 | * | 9/1991 | Ohsaki . |
| 5,971,310 | * | 10/1999 | Saliba et al. . |
| 6,050,514 | * | 4/2000 | Mansbridge . |
| 6,092,754 | * | 7/2000 | Rathweg et al. . |
| 6,095,445 | * | 8/2000 | Hentrich . |

* cited by examiner

Primary Examiner—William A. Rivera
(74) Attorney, Agent, or Firm—Steven G. Roeder

(57) ABSTRACT

An improved tape drive (10) includes a cartridge receiver (18) and a buckler (20). The cartridge receiver (18) receives a cartridge (22) having a cartridge leader (28). The buckler (20) selectively retains a drive leader (32) of the tape drive (10). The tape drive (10) and cartridge (22) include a buckle (30) that securely couples the drive leader (32) of the tape drive (10) to the cartridge leader (28) of the cartridge (22). The buckler (20) includes one or more buckler retainers (96) and a deflector (121). The buckler retainers (96) selectively engage the drive leader (32) and move the drive leader (32) relative to the cartridge leader (28) to couple the drive leader (32) to the cartridge leader (28). The deflector (121) selectively deflects a portion of the drive leader (32) during buckling to enhance the reliability of buckling with certain types of cartridges (22). Because, the drive leader (32) is not deflected all of the time, the drive leader (32) is less likely to permanently deform and the drive leader (32) is less likely to weaken and fail.

38 Claims, 20 Drawing Sheets

BUCKLER FOR A TAPE DRIVE

REFERENCE TO RELATED APPLICATION

This Application is a Continuation-In-Part of U.S. application Ser. No. 09/149,759, filed Sep. 8,1998 U.S. Pat. No. 5,971,310, issued on Oct. 26, 1999, and entitled "Positive Engagement Buckle For A Tape Drive and Cartridge". This Application is also a Continuation-In-Part of U.S. application Ser. No. 09/276,330, filed on Mar. 25, 1999, now U.S. Pat. No. 6,092,754 and entitled "Buckler For A Tape Drive", which is currently pending. The contents of U.S. Pat. No. 5,971,310, and U.S. application Ser. No. 09/276,330 are incorporated herein by reference.

FIELD OF THE INVENTION

The present invention relates generally to tape drives and cartridges that use a storage tape to store and transfer data. More specifically, the present invention relates to a tape drive having an improved buckler for buckling and unbuckling a cartridge leader on the storage tape to a drive leader of the tape drive.

BACKGROUND

Tape drives are widely used for storing information in a digital form. These tape drives commonly use a storage tape having a thin film of magnetic material which receives the information. Typically, the storage tape is moved between a pair of spaced apart reels, past a data transducer to record or read back information from the storage tape.

In one type of tape drive, one of the reels is part of the tape drive, while the other reel is part of a removable cartridge. For this type of tape drive, the reel that is a part of the tape drive is commonly referred to as a take-up reel, while the reel that is a part of the cartridge is commonly referred to as a cartridge reel. With this system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive system.

Typically, a cartridge leader on the storage tape is automatically coupled to a drive leader that is connected to the take-up reel during insertion of the cartridge into the tape drive. The procedure of connecting the drive leader with the cartridge leader is commonly referred to as "buckling" or "coupling". Subsequently, during ejection of the cartridge, the cartridge leader is unbuckled from the drive leader.

FIG. 1A illustrates a prior art cartridge leader 10P coupled to a prior art drive leader 12P. In this embodiment, the cartridge leader 10P includes a hoop 14P and a notch 16P, while the drive leader 12P includes a mushroom shaped tab 18P having a nose 20P and a neck 22P. The hoop 14P is dimensioned to enable the nose 20P and the neck 22P of the drive leader 12P to pass therethrough. The notch 16P is dimensioned to receive the neck 22P, but prevent the nose 20P from passing therethrough.

FIG. 1B illustrates a prior art buckler 24P that automatically couples the prior art cartridge leader 10P of a cartridge 26P to the prior art drive leader 12P. With this system, the prior art buckler 24P has a single, finger type hook 28P that fits into a drive leader aperture 30P (illustrated in FIG. 1A) in the drive leader 12P. The buckler 24P also includes a protrusion 32P that deflects the nose 20P towards the cartridge 26P. The buckler 24P rotates to couple and uncouple the drive leader 12P to the cartridge leader 10P. Commonly assigned U.S. Pat. Nos. 4,662,049 and 4,720,913 provide a detailed discussion of this type of tape buckling arrangement.

Unfortunately, this type of tape buckling arrangement is not completely satisfactory. More specifically, over time, the protrusion 32P can permanently deform the nose 20P of the drive leader 12P. As a result thereof, the drive leader 12P may have difficulty passing along the tape path to the take-up reel.

In light of the above, it is an object of the present invention to provide an easy and accurate way to reliably couple and de-couple a storage tape of a cartridge to a take-up reel of a tape drive. Another object of the present invention is to provide an improved buckler and buckle for a tape drive. Yet another object of the present invention is to provide a tape drive that is compatible with prior art cartridges. Still another object of the present invention is to provide a tape drive system having a buckler and buckle that are relatively easy and cost efficient to manufacture and utilize.

SUMMARY

The present invention is directed to a tape drive that satisfies these objectives. The tape drive includes an improved buckler that couples a drive leader of the tape drive to a cartridge leader of a cartridge. As provided herein, the buckler includes a buckler retainer and a deflector. The buckler retainer selectively retains the drive leader to couple the drive leader to the cartridge leader. The deflector selectively deflects the drive leader.

Preferably, the deflector only deflects a portion of the drive leader during buckling to increase the reliability of buckling with some types of cartridge leaders. In one of the embodiments provided herein, the drive leader includes a mushroom shaped tab that fits within a hoop in the cartridge leader. In this design, the deflector selectively deflects the tab to fit within the hoop during buckling. Alternately, if the drive leader is flexed at all times, the tab may take a permanent set. As a result thereof, the drive leader may have difficulty passing along the tape path to the take-up reel.

Further, the buckler retainer and the deflector each pivot relative to a pivot axis. Importantly, the buckler retainer initially pivots relative to the pivot axis at a different rate than the deflector. In one version of the present invention, the buckler includes a deflector attacher that extends between the deflector and the buckler retainer and allows the buckler retainer to pivot relative to the buckler deflector. This feature allows the buckler retainer to pull the drive leader against the deflector and deflect the tab of the drive leader.

The present invention is also a method for buckling a drive leader of a tape drive to a cartridge leader of a cartridge. The method includes the steps of providing a tape drive and selectively deflecting the drive leader by moving the buckler retainer relative to the deflector.

Importantly, the buckler and buckle provided herein enhance buckling reliability between the cartridge leader and the drive leader. This reduces the possibility of leader runaway. Additionally, the durability of the buckler and buckle is significantly improved.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 2:
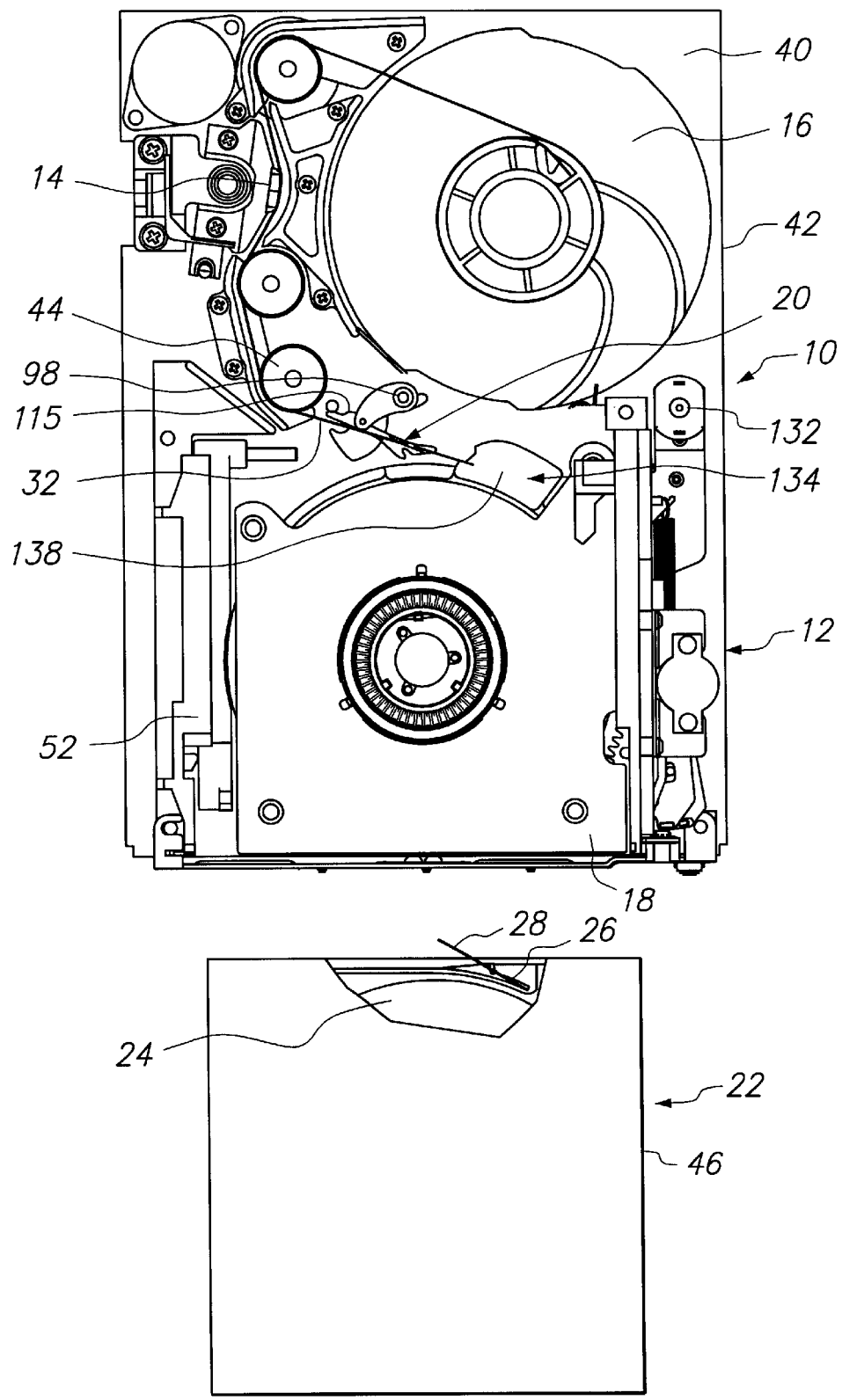
FIG. 2 is a top plan view of a portion of a tape drive and a cartridge, in partial cut-away, having features of the present invention.

Referring initially to FIG. 2, a tape drive 10 having features of the present invention includes a drive housing 12, a data transducer 14, a take-up reel 16, a cartridge receiver 18, and a buckler 20. The tape drive 10 is designed for use in conjunction with a cartridge 22 including a cartridge reel 24 and a storage tape 26 having a cartridge leader 28. A buckle 30 (illustrated in FIGS. 5A–6B) secures a drive leader 32 of the tape drive 10 to the cartridge leader 28. As provided in detail below, the buckler 20 moves the drive leader 32 relative to the cartridge leader 28 to automatically couple and uncouple the buckle 30 to attach the drive leader 32 to the cartridge leader 28.

The buckler 20 provided herein selectively deflects a portion of the drive leader 32 during buckling to increase the reliability of buckling with some types of cartridge leaders 28. Importantly, the buckler 20 only deflects a portion of the drive leader 32 during buckling. If a portion of the drive leader 32 is flexed at all times, then that portion of the drive leader 32 may take a permanent set. As a result thereof, the drive leader 32 may have difficulty passing along the tape path to the take-up reel 16. Further, this may weaken drive leader 32.

Figure 3:
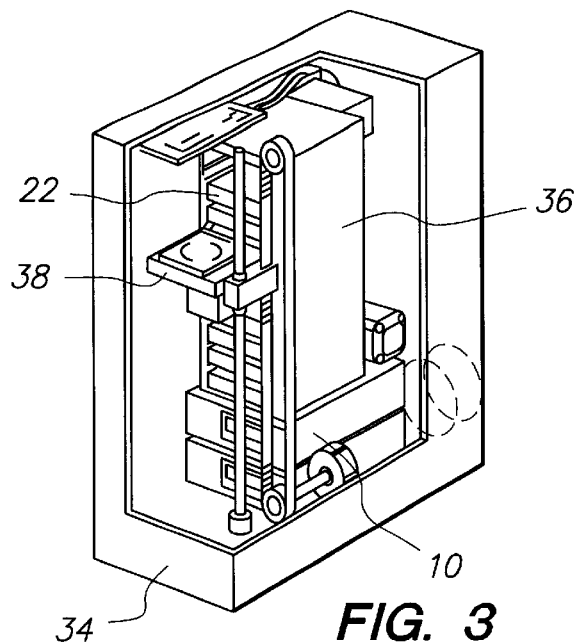
FIG. 3 is a perspective, partly cut-away view of a tape library having features of the present invention.

The tape drive 10 is typically installed within a computer (not shown), or a word processor (not shown). Alternately, referring to FIG. 3, the tape drive 10 can be utilized as part of a tape library 34. In this embodiment, the tape library 34 includes a plurality of cartridges 22 which are retained in a multiple cartridge magazine 36, a robotic cartridge handler 38 and a pair of tape drives 10. The robotic cartridge handler 38 selectively retrieves one of the cartridges 22 from the cartridge magazine 36 and places the cartridge 22 within one of the tape drives 10. A representative tape library 34 is sold under the trademark DLTstor™, by Quantum Corporation, the Assignee of the present invention.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of the tape drive 10 which are particularly significant to the present invention are provided herein. A representative tape drive 10 is sold by Quantum Corporation, under the trademark DLT™4000.

The drive housing 12 retains the various components of the tape drive 10. The drive housing 12, illustrated in FIG. 2, includes a base 40, four spaced apart side walls 42 and a cover (not illustrated in FIG. 2 for clarity). The tape drive 10 includes a plurality of tape rollers 44 for guiding the storage tape 26 past the data transducer 14 and onto the take-up reel 16.

The storage tape 26 stores data in a form that can be subsequently retrieved if necessary. A magnetic storage tape 26 is commonly used to store data in digital form. For conservation of space, the storage tape 26 has a tape width of preferably at least approximately one-half an inch (0.5 in). Alternately, for example, the storage tape 26 can have a tape width of between approximately four millimeters to eight millimeters (4.0 mm–8.0 mm). The storage tape 26 includes a storage surface on one side of the storage tape 26 for storing data. The storage surface is divided into a plurality of tracks (not shown). The storage tape 26 is initially retained on the cartridge reel 24 of the cartridge 22.

Figure 4A:
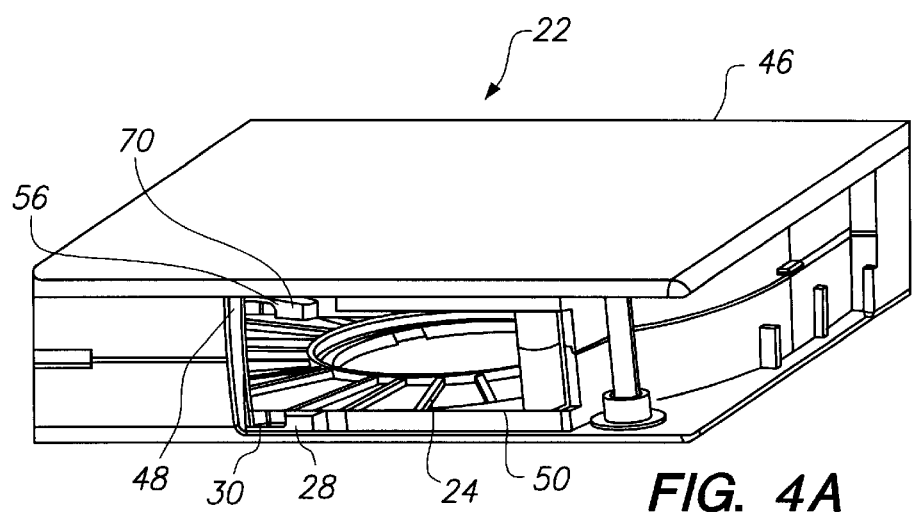
FIG. 4A is a perspective view of a cartridge having features of the present invention.

FIG. 4A illustrates a rear perspective view of a cartridge 22 having features of the present invention. In FIG. 4A, the cartridge 22 includes a substantially rectangular cartridge housing 46 which encloses the cartridge reel 24 and the storage tape 26 (not shown in FIG. 4A). The cartridge housing 46 includes a cartridge door (not shown for clarity) which pivots between an open door position in which the cartridge leader 28 is exposed and a closed door position. FIG. 4A illustrates that the cartridge housing 46 includes a cartridge stop 48 positioned near the cartridge reel 24 and a housing opening 50 in the cartridge housing 46. The cartridge stop 48 is sized and positioned to prevent the portion of buckle 30 that is attached to the cartridge leader 28 from retracting onto the cartridge reel 24. This maintains the buckle 30 outside the path of the storage tape 26 on the cartridge reel 24. Further, this ensures that buckling occurs away from the storage tape 26 to prevent damage to the storage tape 26.

Figure 1A:
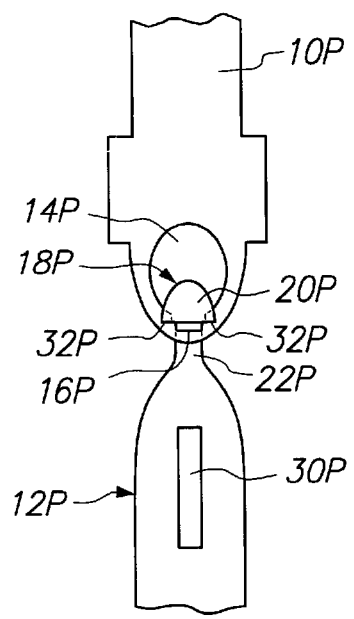
FIG. 1A is a top plan view of a coupled, prior art cartridge leader and drive leader.
Figure 1B:
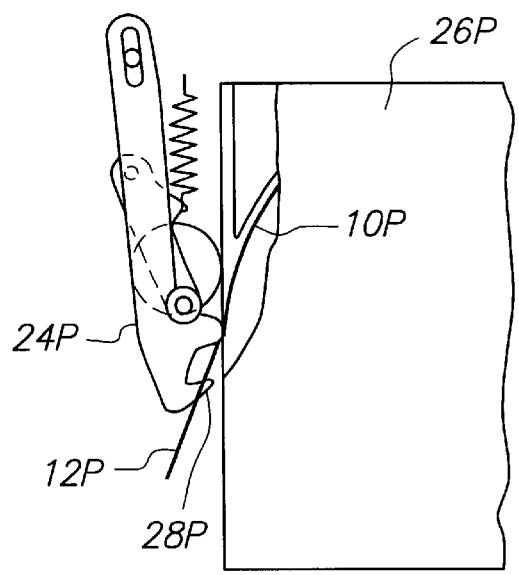
FIG. 1B is a top plan view of a prior art buckler and a portion of a prior art cartridge.
Figure 4B:
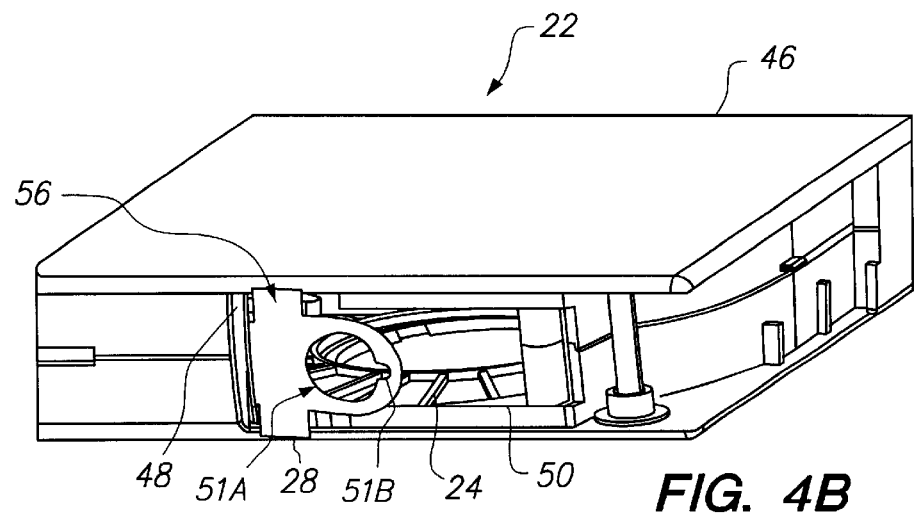
FIG. 4B is a perspective view of another cartridge.

FIG. 4B illustrates a rear perspective view of another cartridge 22. In this embodiment, the cartridge leader 28 includes some of the features of the prior art cartridge leader 10P discussed in the Background section of this Application. In particular, in this embodiment, the cartridge leader 28 includes a hoop 51A and a notch 51B that are somewhat similar to the hoop 14P and notch 16P illustrated in FIG. 1A.

Referring back to FIG. 2, the cartridge receiver 18 is positioned within the drive housing 12 and selectively receives the cartridge 22. The cartridge receiver 18 includes a protruding wall 52 that contacts the cartridge door (not shown) during movement of the cartridge 22 in the cartridge receiver 18. This causes the cartridge door to move from the closed door position to the open door position.

The buckle 30 secures the drive leader 32 of the tape drive 10 to the cartridge leader 28 of the cartridge 22. The buckle 30 includes a first buckle component 54 attached to the drive leader 32 and a second buckle component 56 attached to the cartridge leader 28. The buckle 30 reliably and securely couples the cartridge leader 28 to the drive leader 32. This reduces the likelihood of leader runaway.

A number of alternate embodiments of the buckle 30 are illustrated in the FIGS. 5A–6B. In a first embodiment of the buckle 30, the first buckle component 54 includes a bar-shaped, buckle bar 58 that is secured to the drive leader 32. In this embodiment, the buckle bar 58 is a substantially straight piece of a rigid material, having a substantially circular cross section. The buckle bar 58 extends transversely across the drive leader 32. The buckle bar 58 preferably has a bar length 60 which is greater than a leader width 62 of the drive leader 32. Because the bar length 60 is greater than the leader width 62, the buckle bar 58 has a pair of bar ends 64 which cantilever past opposed edges 65 of the drive leader 32. Stated another way, the buckle bar 58 includes a first bar section 66 which extends away from one of the leader edges 65 and a second bar section 68 which extends away from the other leader edge 65 of the drive leader 32.

In the first embodiment of the buckle 30, the second buckle component 56 includes a pair of spaced apart bar receivers 70. Each bar receiver 70 is sized and shaped to receive a portion of one of the bar sections 66, 68 to couple the drive leader 32 to the cartridge leader 28. The use of two spaced apart bar receivers 70 ensures a reliable connection between the leaders 28, 32.

FIGS. 5A–5F illustrate the first embodiment of the buckle 30. As can best be seen with reference to FIG. 5A, each of the bar ends 64 of the buckle bar 58 is spherical shaped. Further, in this embodiment, the bar receivers 70 are secured together with a connector bar 72, which is attached to the cartridge leader 28. In this embodiment, the bar receivers 70 are spaced apart a receiver distance 74 by the connector bar 72.

Preferably, the receiver distance 74 is greater than the leader width 62. This allows the bar receivers 70 to engage the cartridge stop 48 (FIG. 4A) in the cartridge housing 46 to inhibit the cartridge leader 28 from being pulled back into the cartridge housing 46. Further, this keeps the buckle 30 away from the cartridge reel 24 and out of the path of the storage tape 26 to protect the storage tape 26.

In the embodiment illustrated in FIGS. 5A–5F, each bar receiver 70 is sized and shaped to receive one of the bar ends 64. Each of the bar receivers 70 is defined by a substantially rectangular receiver housing 76. Each receiver housing 76 includes a channel 78 having a channel opening 80 and a channel end 82. During coupling, the buckle bar 58 is inserted into the channel opening 80. Subsequently, the buckle bar 58 is forced to slide in the channel 78 until the buckle bar 58 reaches the channel end 82.

Preferably, each channel 78 includes a bump 84 that projects into the channel 78 near the channel end 82. The bump 84 reliably holds the buckle bar 58 against the channel end 82. In the embodiment illustrated in the FIGS. 5A–5F, each bump 84 is ramped shaped to facilitate movement over the bump 84. Alternately, for example, each bump 84 could be semi-circular shaped.

Each channel 78 is wide enough to receive the buckle bar 58. Further, the channels 78 are spaced apart so that a bottom of each channel 78 substantially contacts the bar ends 64 of the buckle bar 58 when the buckle bar 58 is placed in the channels 78.

Figure 5A:
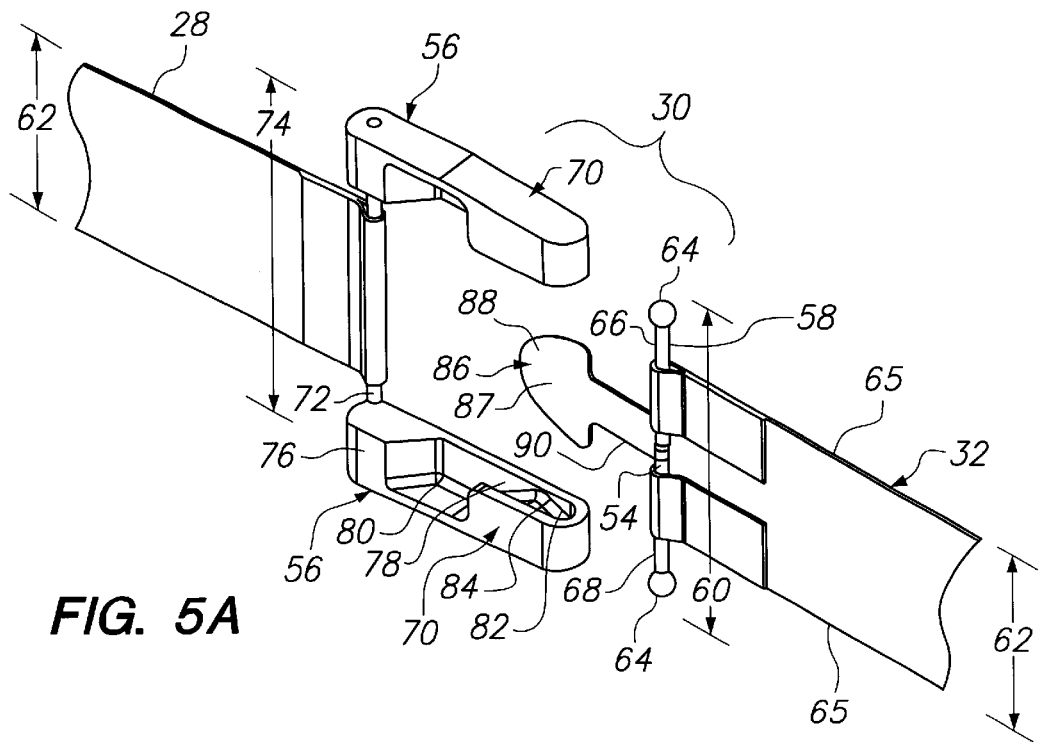
FIGS. 5A–5C are perspective views of a first embodiment of buckle during different stages of coupling.
Figure 5B:
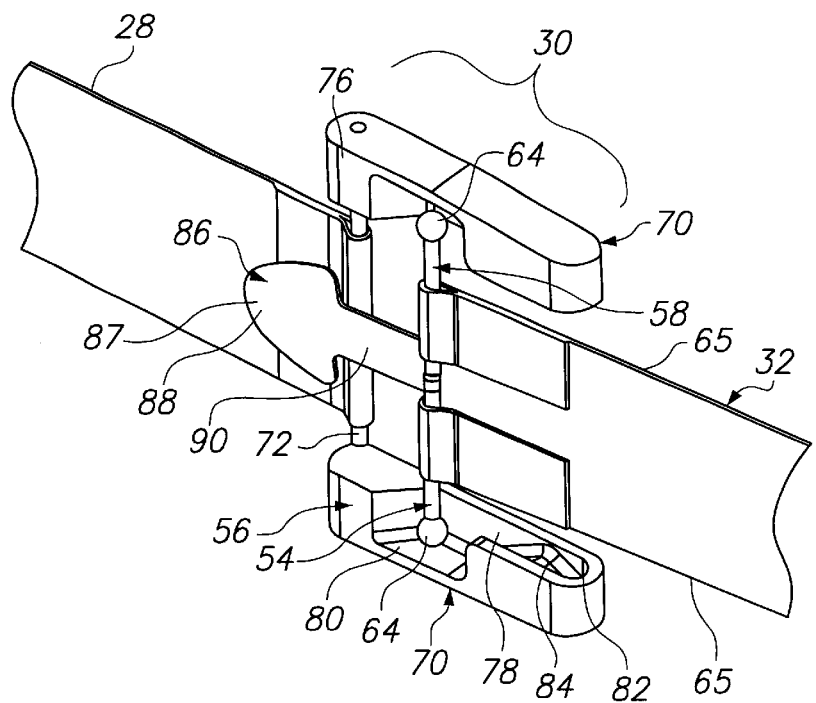
Figure 5C:
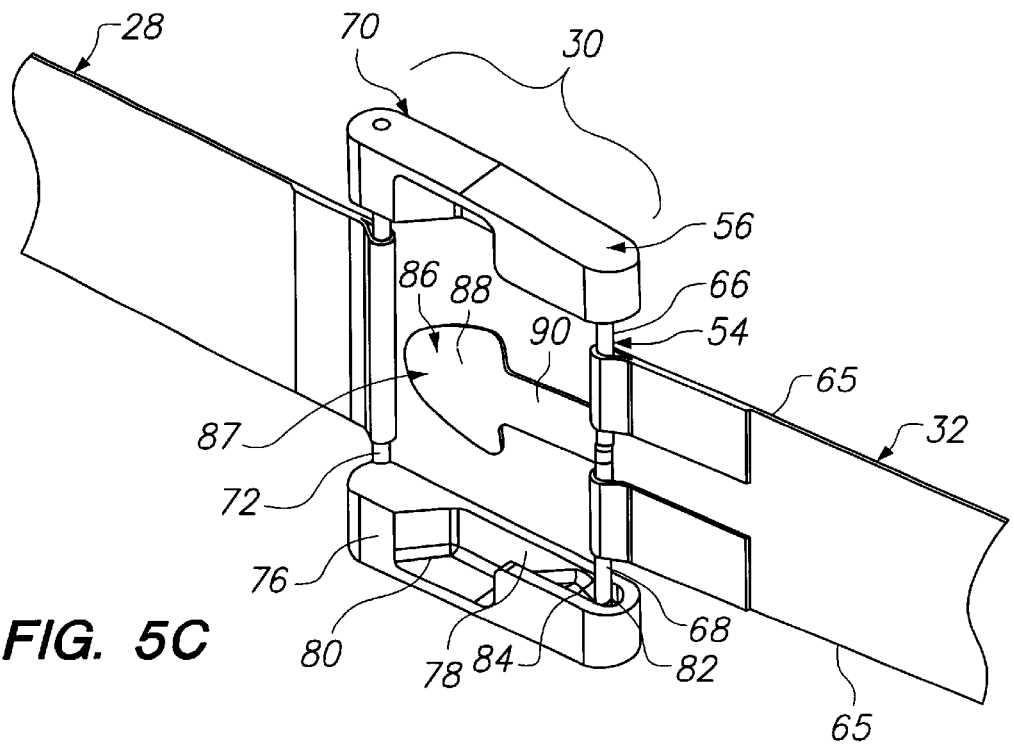
Figure 5G:
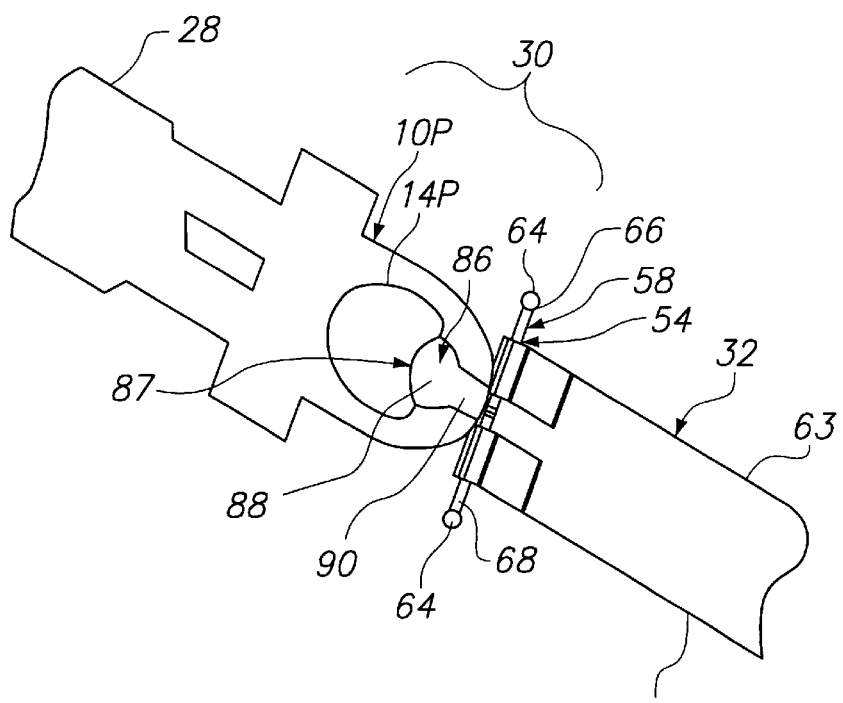
FIG. 5G is a perspective view of a portion of the buckle of FIG. 5A coupled to a cartridge leader.
Figure 5D:
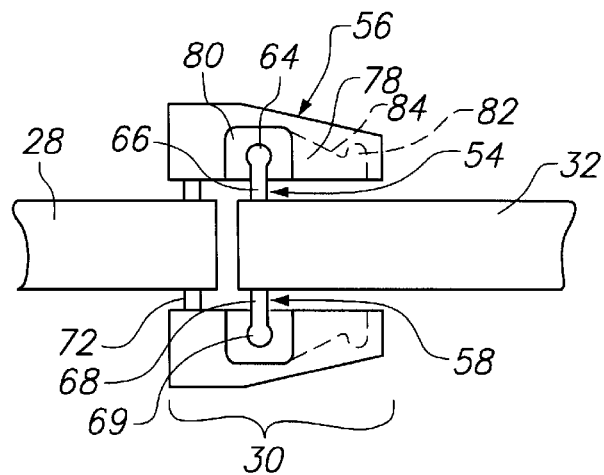
FIGS. 5D–5F illustrate the relative position of the buckle during different stages of coupling.
Figure 5E:
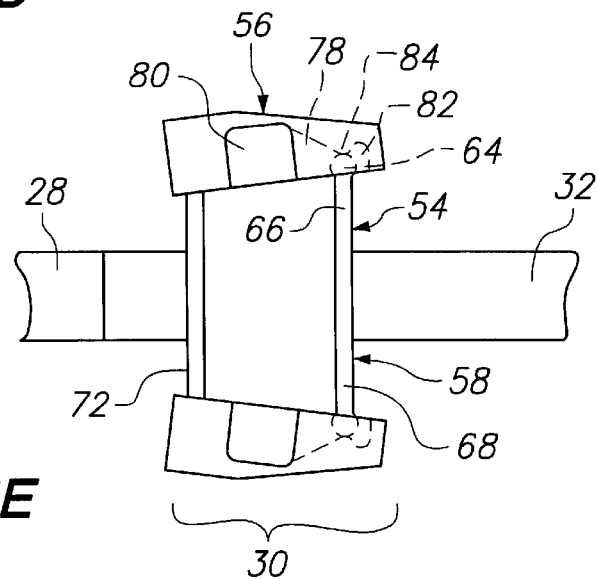
Figure 5F:
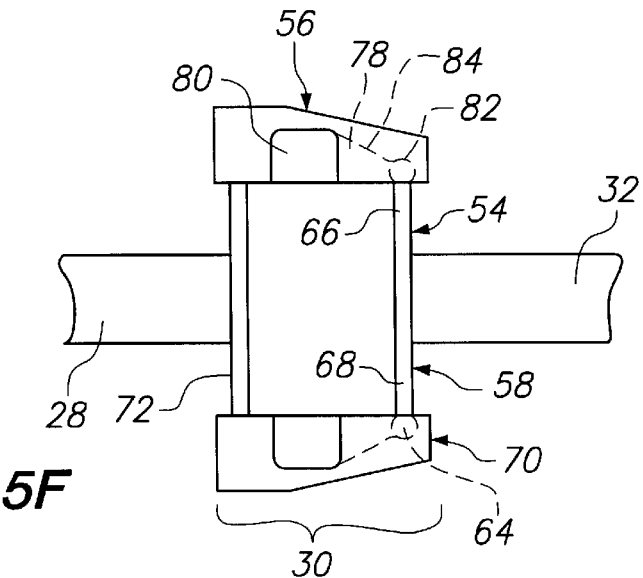

FIGS. 5D–5F illustrate the interaction between the first and second buckle components 54, 56 of the first embodiment of the buckle 30 during the buckling process. In particular, referring to FIG. 5E, the bar receivers 70 and the connector bar 72 can flex to allow the buckle bar 58 to pass over the bumps 84. The flex illustrated in FIG. 5E is exaggerated to facilitate this discussion.

FIG. 5G illustrates another embodiment of the buckle 30. In this embodiment, the drive leader 32 includes an alternate first buckle component 86 that allows the drive leader 32 to couple to another type of cartridge 22. More specifically, the alternate first buckle component 86 allows the drive leader 32 to couple to a cartridge leader 28 that includes some of the features of the prior art cartridge leader 10P discussed in the Background section of this Application. In particular, in this embodiment, the alternate first buckle component 86 allows the drive leader 32 to couple to a cartridge leader 28 having the hoop 51A and the notch 51B that are similar to the hoop 14P and notch 16P illustrated in FIG. 1A.

In the embodiment illustrated in FIG. 5G, the alternate first buckle component 86 projects away from a distal end of the drive leader 32. In this embodiment, the alternate first buckle component 86 is a mushroom shaped tab 87 that is adapted to engage the hoop 51A and the notch 51B of the cartridge leader 28. The alternate first buckle component 86 includes a nose 88 which is dimensioned to fit through the hoop 51A but not the notch 51B. The alternate first buckle component 86 also includes a neck 90 that is designed to fit in both the hoop 51A and notch 51B. Thus, the alternate first buckle component 86 allows the tape drive 10 and the drive leader 32 to buckle with the cartridges 22 illustrated in FIG. 4B.

Preferably, the drive leader 32 includes both the first buckle component 54 and the alternate first buckle component 86. This feature allows the tape drive 10 to be compatible with the cartridge 22 illustrated in FIG. 4A and the cartridge 22 illustrated in FIG. 4B. Stated another way, the drive leader 32 is preferably designed to be compatible with two or more different styles of cartridges.

Figure 6A:
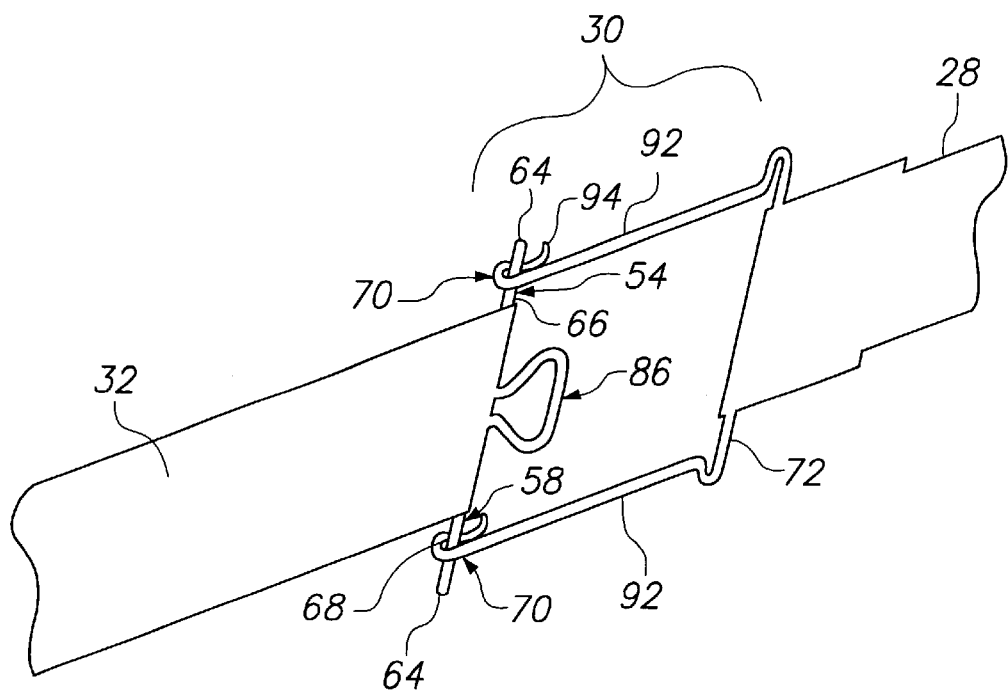
FIG. 6A is a perspective view of another embodiment of a buckle having features of the present invention.

FIG. 6A illustrates yet another embodiment of the buckle 30. Similar to the first embodiment discussed above, the buckle bar 58 is elongated, bar shaped and includes a pair of opposed bar ends 64. In this embodiment, the spaced apart bar receivers 70 are again secured together with a connector bar 72 which is secured to the cartridge leader 28. Again, the bar receivers 70 are spaced apart sufficiently to engage the cartridge stop 48 (illustrated in FIG. 4) in the cartridge housing 46 to inhibit the cartridge leader 28 from being pulled back into the cartridge housing 46.

In the embodiment illustrated in FIG. 6A, the connector bar 72 and the bar receivers 70 are made as a uniform second buckle component 56. The second buckle component 56 includes the relatively straight connector bar 72 with a pair of receiver bars 92 extending generally transversely to the connector bar 72. Each bar receiver 70 is positioned at a distal end of each connector bar 72. In this embodiment, each bar receiver 70 is a clasp that is sized and shaped to receive a portion of the buckle bar 58. Each clasp is hook shaped and substantially encircles a portion of one of the bar sections 66, 68. A distal end 94 of each clasp includes an outwardly protruding lip which curves away from the receiver bar 92 to facilitate placement of the bar section 66, 68 within the clasp. In this embodiment, the bar receivers 70 are made of a spring like material having a circular cross section.

Figure 6B:
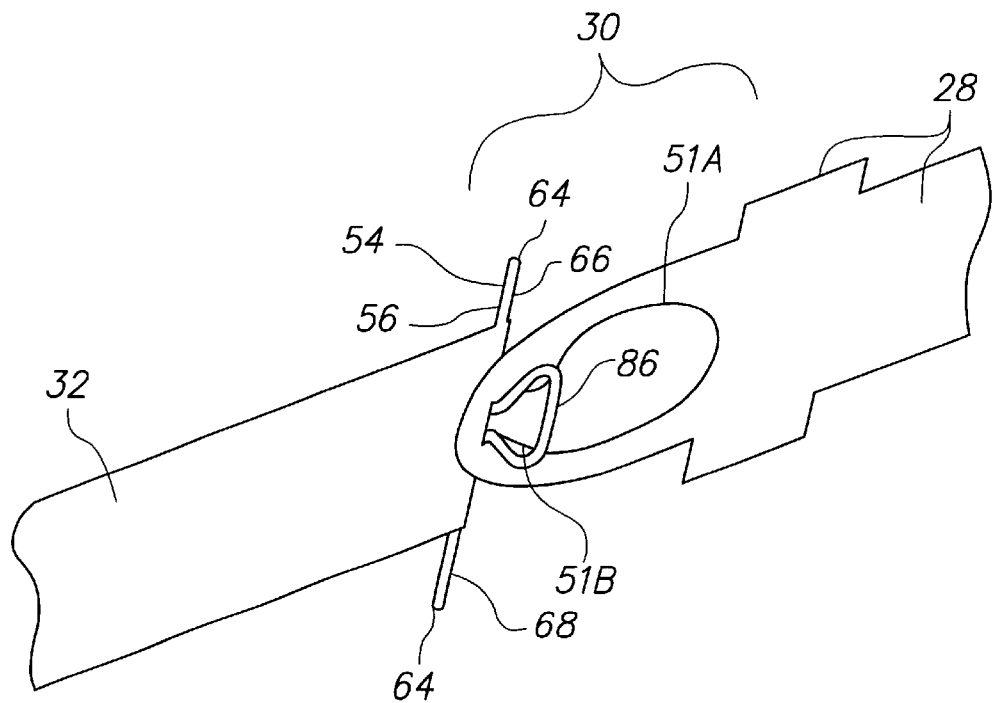
FIG. 6B is a perspective view of a portion of a buckle coupled to a cartridge leader.

As illustrated in FIG. 6B, the drive leader 32 preferably also includes the alternate first buckle component 86 that projects away from the distal end of the drive leader 32. The alternate first buckle component 86 engages the cartridge leader 28 and allows the tape drive 10 and the drive leader 32 to be compatible with the cartridge illustrated in FIG. 4B. In this embodiment, the alternate first buckle component 86 is formed from the same wire as the buckle bar 58.

Figure 9:
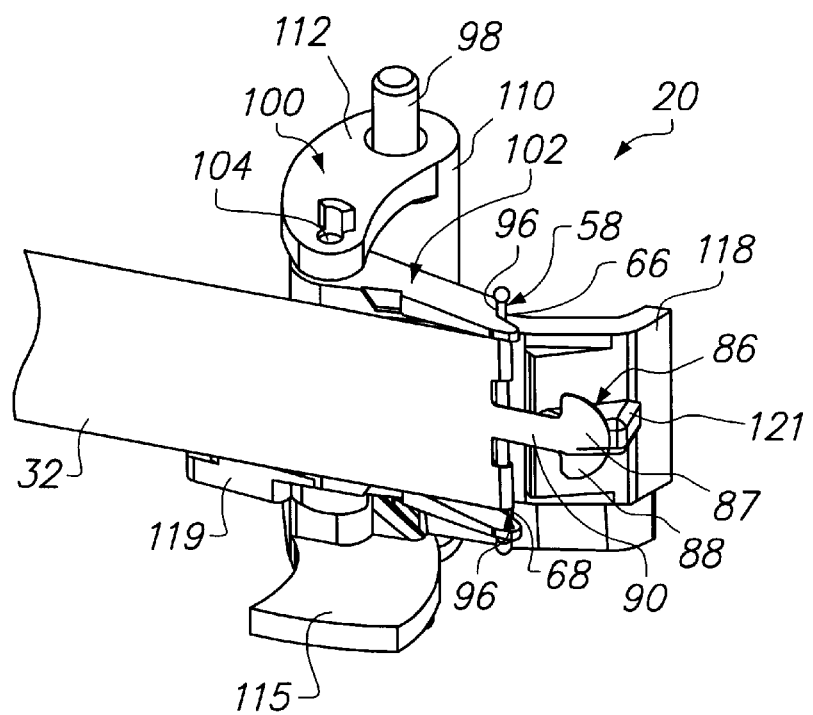
FIG. 9 is a perspective view of the buckler of FIG. 7A and 7B and a portion of a buckle.

The buckler 20 moves relative to the cartridge receiver 18 to couple and uncouple the buckle 30. More specifically, the buckler 20 selectively retains and moves the drive leader 32 to couple the drive leader 32 to the cartridge leader 28. A couple of alternate bucklers 20 are provided. In each of the embodiments illustrated herein, the buckler 20 selectively retains the drive leader 32 at the buckle bar 58. Further, in each of the embodiments illustrated herein, the buckler 20 includes a pair of spaced apart, buckler retainers 96 that selectively retain the buckle bar 58 (illustrated in FIG. 9). More specifically, each buckler retainer 96 selectively engages one of the bar sections 66, 68 to selectively retain and move the drive leader 32.

In each of the embodiments illustrated in the Figures, the buckler 20 is positioned near a back of the cartridge receiver 18 and rotates relative to the cartridge receiver 18 on a buckler pin 98. The buckler pin 98 is fixedly mounted to the base 40 of the drive housing 12. In each of the embodiments illustrated in the Figures, the buckler 20 includes a first component 100, a second component 102, a connector pin 104, a connector spring 106, a buckler spring 108, and a deflector 121.

FIGS. 7A–14D illustrate a first version of the buckler 20. Referring initially to FIGS. 7A–9, the first component 100 includes (i) a tube shaped section 110 that pivots on the buckler pin 98, and (ii) an upper arm 112, an intermediate wall 113, and a lower arm 114 that cantilever away from the tube shaped section 110 and rotate with the tube shaped section 110. A buckler cam 115 cantilevers away from the lower arm 114. The buckler cam 115 interacts with a ring cam 138 (illustrated in FIGS. 14A–14D). Movement of the ring cam 138 causes the ring cam 138 to engage the buckler cam 115 to rotate the first component 100 around the buckler pin 98 as discussed below (illustrated in FIGS. 14A–14D).

Figure 7A:
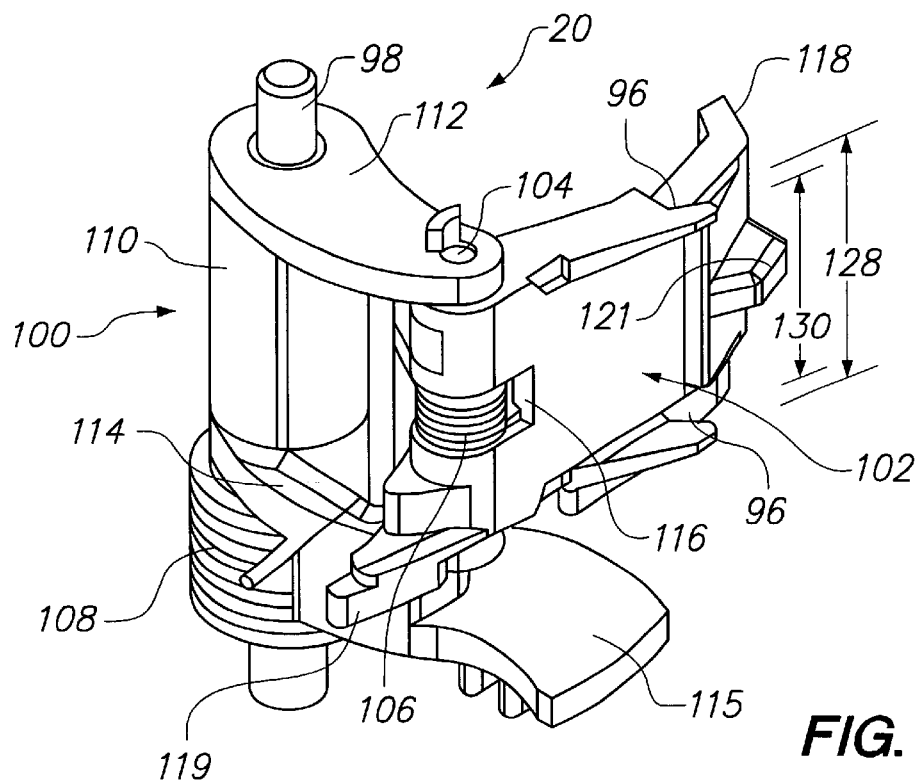
FIGS. 7A and 7B are perspective views of a buckler having features of the present invention.
Figure 7B:
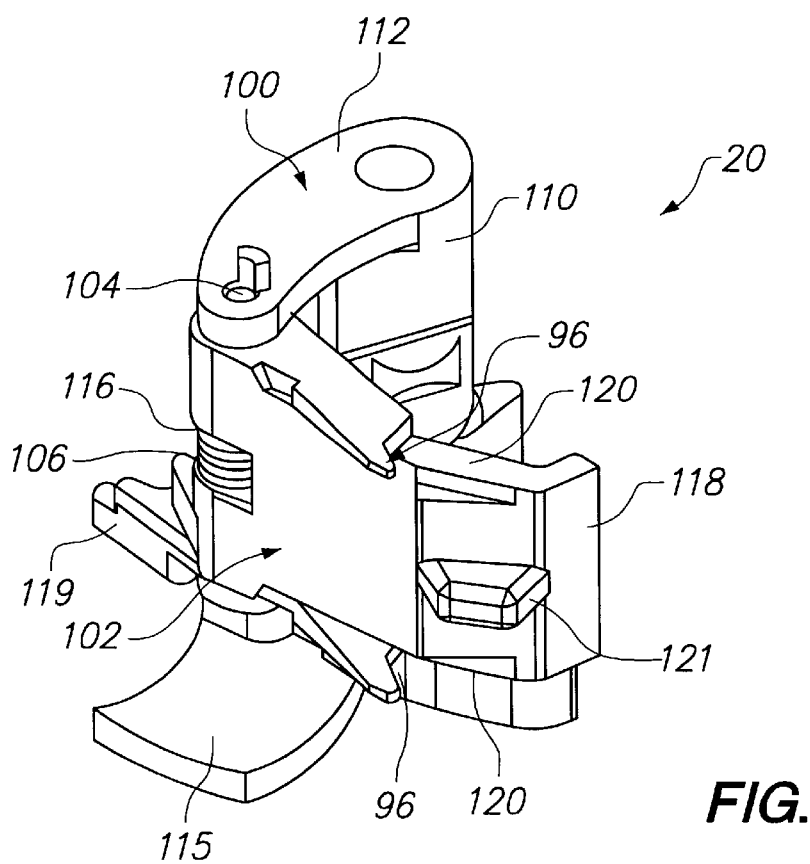
Figure 8:
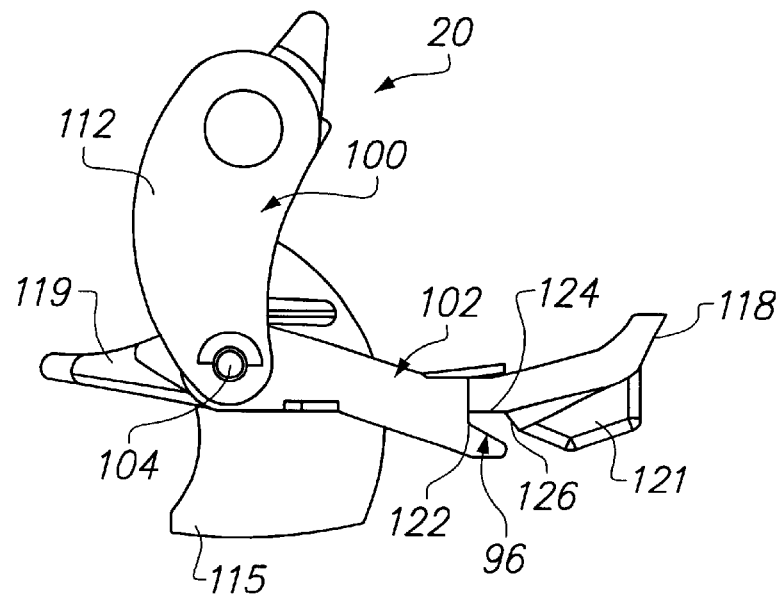
FIG. 8 is a top plan view of the buckler of FIG. 7A and 7B.

As best can be seen with reference to FIG. 7A, the buckler spring 108 is coiled around buckler pin 98. Additionally, the buckler spring 108 is connected to the first component 100 and the base 40 (not shown in FIG. 7A). The buckler spring 108 is biased to cause the buckler 20 to rotate in a counter-clockwise direction towards the cartridge receiver 18. This causes the buckler 20 to be biased to rotate towards the cartridge receiver 18.

The second component 102 is attached to, cantilevers away from and rotates relative to the first component 100 on the connector pin 104. More specifically, the connector pin 104 extends through apertures in the upper arm 112, the lower arm 114 and a proximal end of the second component 102 to connect the second component 102 to the first component 100. The proximal end of the second component 102 includes a gap 116 that allows the connector spring 106 to encircle the connector pin 104.

In the first embodiment of the buckler 20, the connector spring 106 engages the first component 100 and the second component 102. The connector spring 106 is biased to cause the second component 102 to rotate relative to the first component 100 in a clockwise direction away from the buckler pin 98. Stated another way, the connector spring 106 is biased to inhibit the second component 102 from folding towards the first component 100.

A distal end of the second component 102 includes a tapered lip 118 to protect the storage tape 26 from the buckler 20. Additionally, a buckler tab 119 extends and cantilevers from the proximal end of the second component 102. The buckler tab 119 interacts with a buckler stop 117 (illustrated in FIGS. 10C, 10D, 14A–14D) and causes the second component 102 and the buckler retainers 96 to move away from the drive leader 32. Stated another way, the interaction between the buckler tab 119 and the buckler stop 117 causes the second component 102 to fold towards the first component 100 and the buckler pin 98.

The spaced apart buckler retainers 96 extend away from opposed edges 120 of the second component 102 intermediate the distal end and the proximal end of the second component 102. The design of the buckler retainers 96 can be varied. In the embodiment illustrated in the Figures, the buckler retainers 96 engage the buckle bar 58 at each bar section 66, 68. As can best be seen with reference to FIG. 8, each buckle retainer 96 includes a channel shaped opening that is formed with a rear surface 122, a bottom surface 124 and a front surface 126.

As illustrated in FIG. 7A, the outer edges of the buckle retainers 96 are spaced apart a buckler retainer outer distance 128 which is less than the bar length 60 and the receiver distance 74. The inner edges of the buckler retainers 96 are spaced apart a buckler retainer inner distance 130 that is greater than the leader width 62. This allows the buckler retainers 96 to be positioned near the leader edges 65 to retain the buckle bar 58.

The deflector 121 extends away from the second component 102 between the buckler retainers 96 and the tapered lip 118. The deflector 121 facilitates buckling with the cartridge leader 28 and the cartridge 22 illustrated in FIG. 4B. In the first embodiment of the buckler 20, the deflector 121 is integrally formed with and moves with the second component 102. In this embodiment, referring to FIGS. 9 and 13A, the deflector 121 supports the tab 87 of the alternate first buckle component 86. More specifically, the deflector 121 deflects the tab 87 to obtain maximum penetration of the tab 87 into the hoop 51A and the notch 51B of the cartridge 22 illustrated in FIG. 4B. Stated another way, the deflector 121 holds the tab 87 outward and in the correct position. This allows the hoop 51A of the cartridge 22 illustrated in FIG. 4B to fit around the tab 87 during insertion of the cartridge 22 in the cartridge receiver 18.

Additionally, the second component 102 can include a pair of spaced apart, ramped sections 125. The ramped sections 125 are positioned on opposite sides of the deflector 121. The ramped sections 125 form a part of the channel shaped opening of each bucker retainer 96.

Figure 10A:
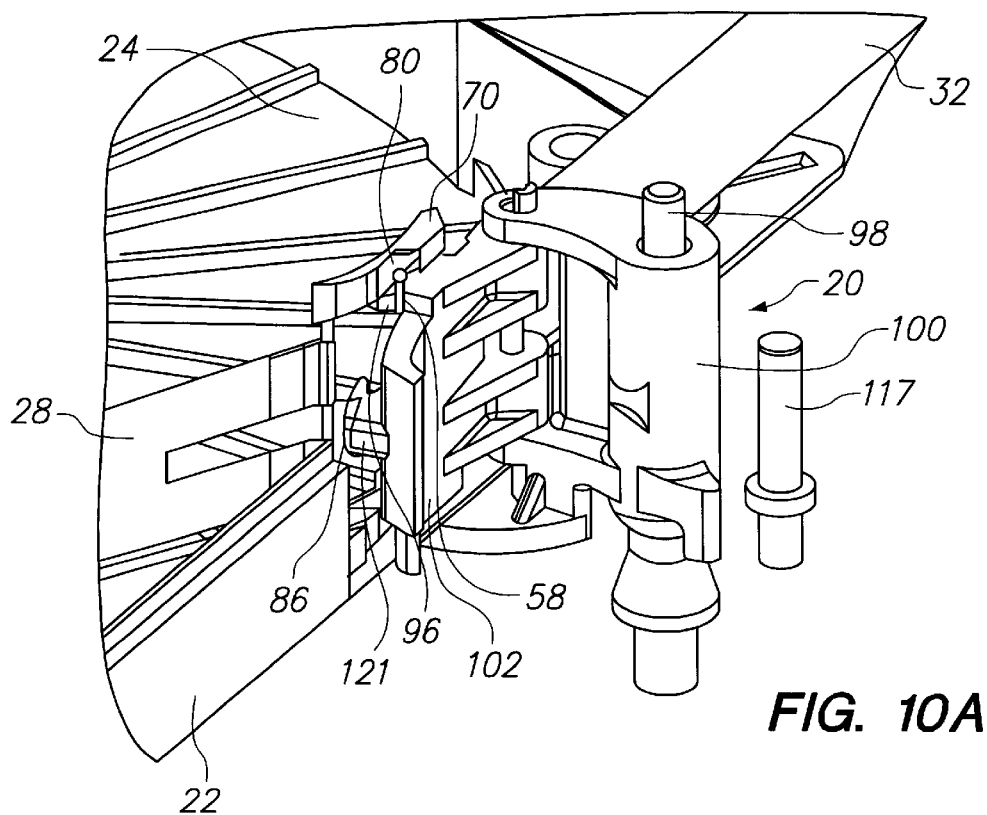
FIGS. 10A–10D illustrate a rear perspective view of the buckler, a portion of a cartridge, a drive leader and a cartridge leader during alternate stages of coupling.
Figure 10B:
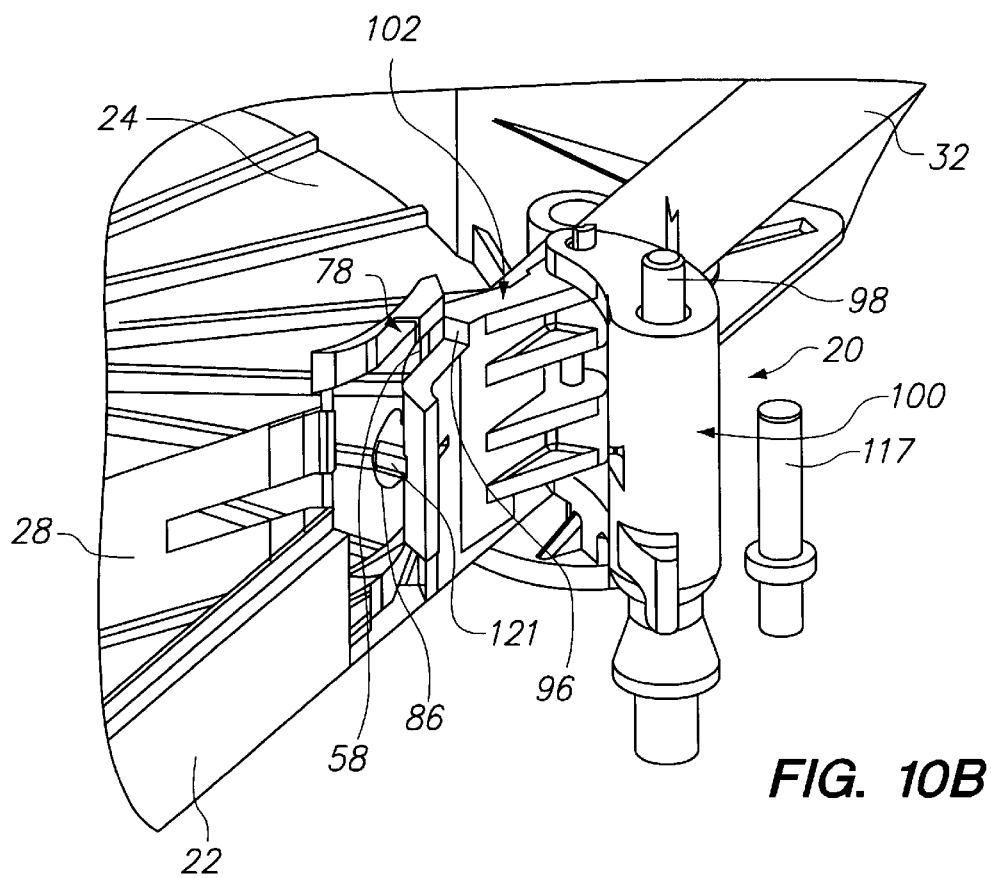
Figure 10C:
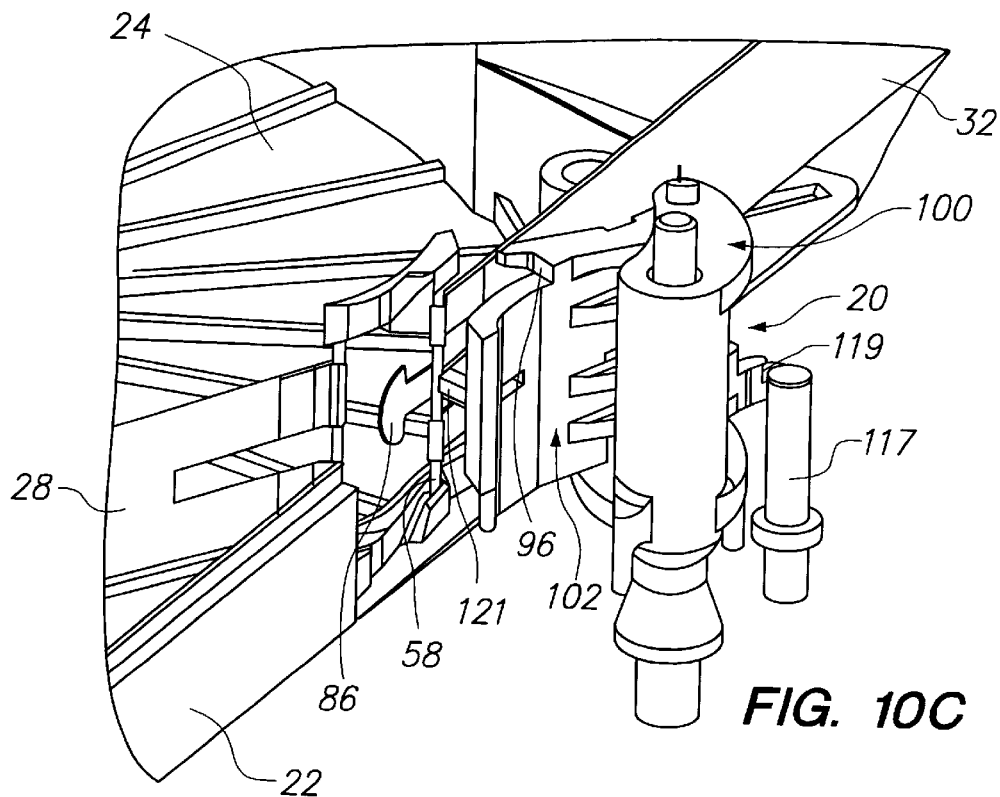
Figure 10D:
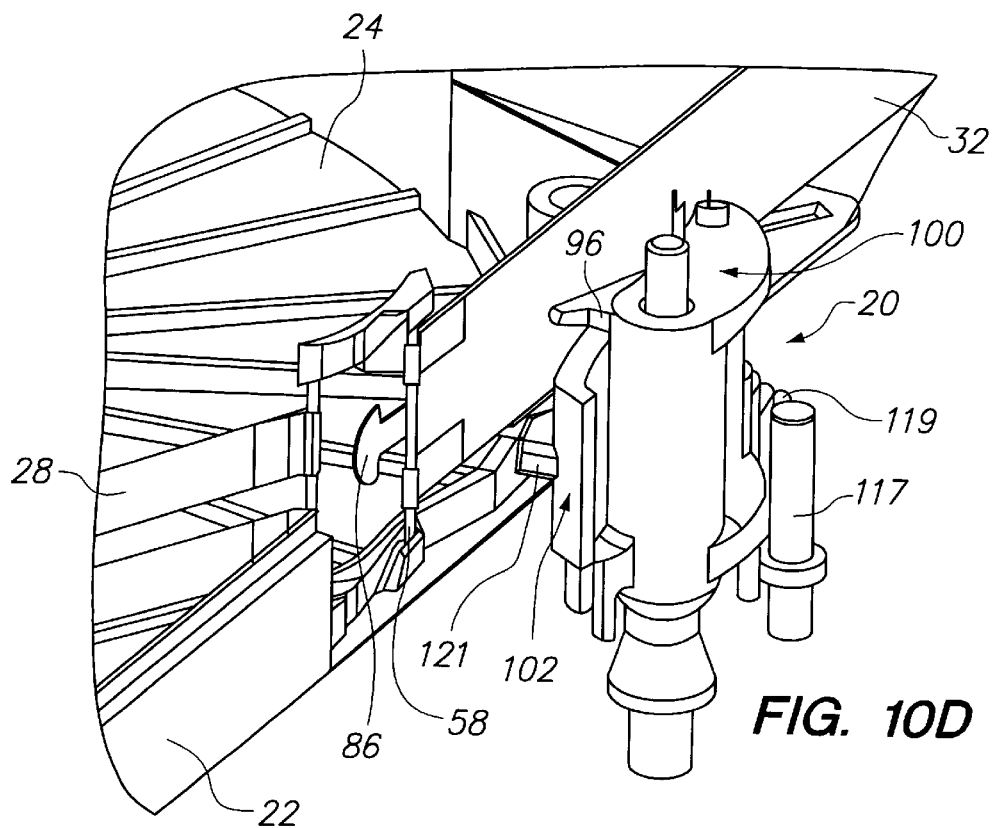

The interaction between the buckle retainers 96 and the buckle bar 58 during coupling and uncoupling can best be understood with reference to FIGS. 10A–12. In particular, FIGS. 10A–10D sequentially illustrate a rear perspective view of the buckler 20, a portion of the cartridge 22, the drive leader 32 and cartridge leader 28 during buckling. In particular, FIG. 10A illustrates the buckler 20 initially holding the buckle bar 58 so that the channel openings 80 of the bar receivers 70 slide over the buckle bar 58 when the cartridge 22 is inserted into the cartridge receiver 18. FIG. 10B illustrates the buckler 20 rotating in a counter-clockwise direction away from the cartridge receiver 18 to pull the buckle bar 58 in each channel 78. FIG. 10C illustrates the buckler 20 partly rotated away from the drive leader 32. FIG. 10D illustrates the buckler 20 after it is rotated away from the drive leader 32 out of the path of the storage tape 26. Importantly, as illustrated in FIG. 10C and 10D, the buckler tab 119 contacts the buckler stop 117 so that rotation of the buckler 20 causes the second component 102 to rotate towards the first component 100 to fold the buckler 20 and to disengage from the buckle bar 58. Further, this causes the buckler 20 to rotate away from the path of the storage tape 26.

Figure 11:
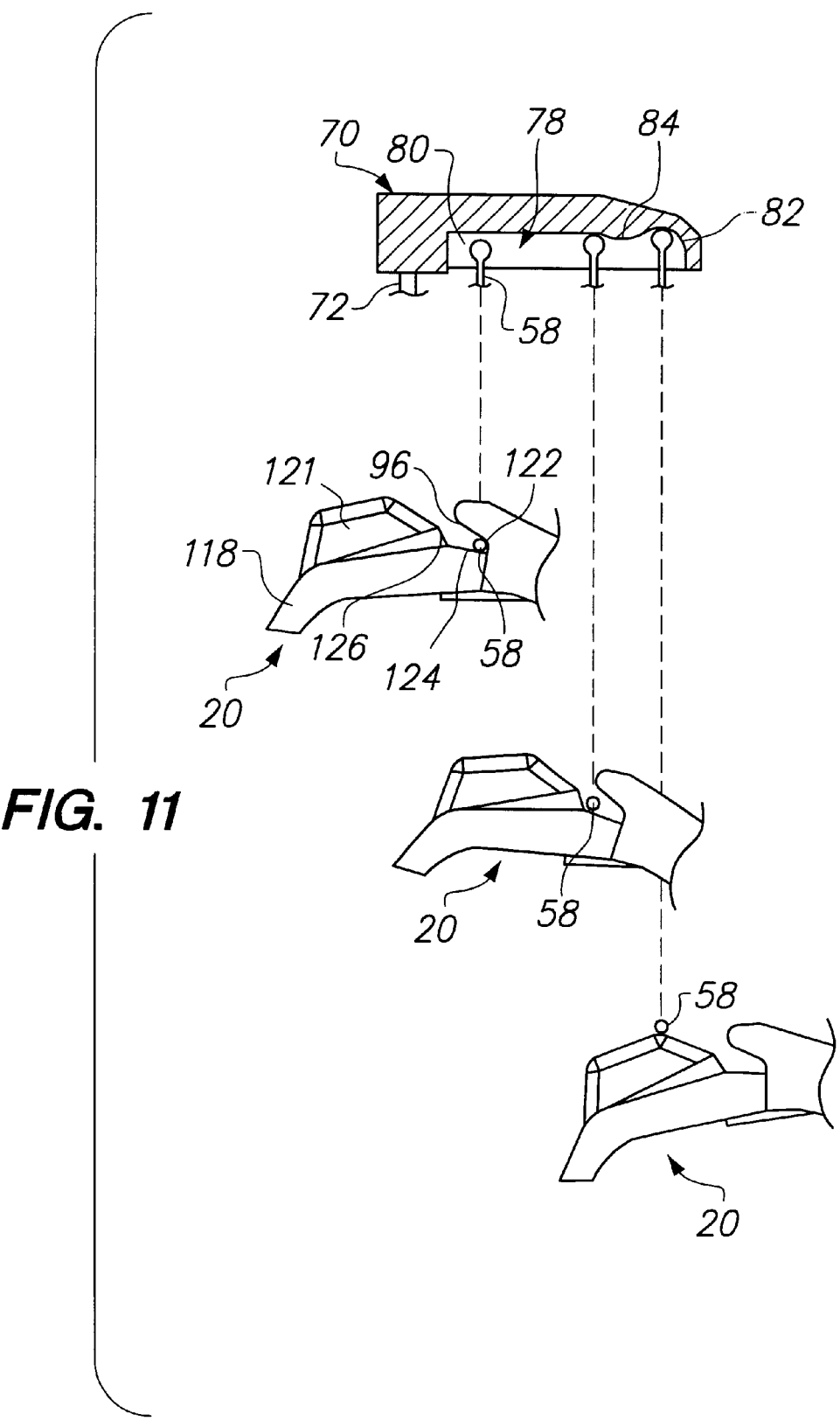
FIG. 11 illustrates the interaction between the buckler and the buckle during the buckle process.

FIG. 11 illustrates the relative position of the buckler 20 and the buckle bar 58 during various stages of buckling. In particular, the buckle bar 58 is initially in contact with the rear and bottom surfaces 122, 124 of each buckle retainer 96. In this position, the buckle bar 58 is ready to slide into the channel openings 80 of the bar receivers 70 when the cartridge 22 is inserted into the cartridge receiver 18. Next, rotation of the buckler 20 causes the buckle bar 58 to contact the front and bottom surfaces 126, 124 of each buckler retainer 96. Subsequent movement of the buckler 20 causes the buckler retainers 96 to pull the buckle bar 58 in the channels 78 past the bumps 84 to the channel ends 82. Subsequently, the buckle retainers 96 are moved away from the buckle bar 58 and the path of the storage tape 26.

Figure 12:
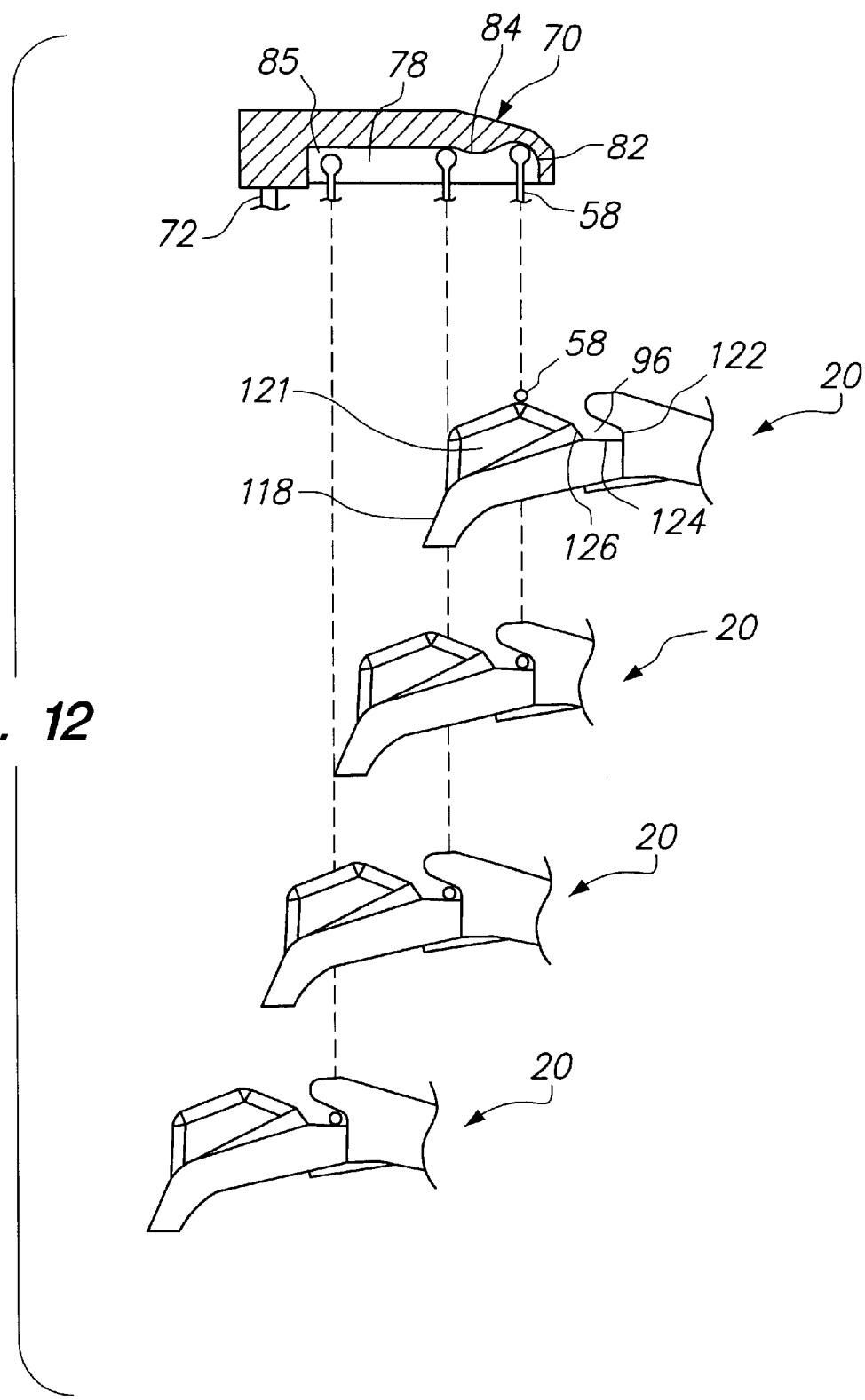
FIG. 12 illustrates the interaction between the buckler and the buckle during the unbuckling process.

FIG. 12 illustrates the relative position of the buckler 20 and the buckle bar 58 during alternate stages of unbuckling. During the unbuckling process, rotation of the buckler 20 causes the deflector 121, and subsequently the ramped sections 125, to initially contact the buckle bar 58. Next, additional movement of the buckler 20 causes the rear and bottom surfaces 122, 124 to contact the buckle bar 58 and move the buckle bar 58 past the bumps 84 and to the channel openings 80 of each bar receiver 70. In this position, the cartridge 22 can be removed from the cartridge receiver 18.

Figure 13A:
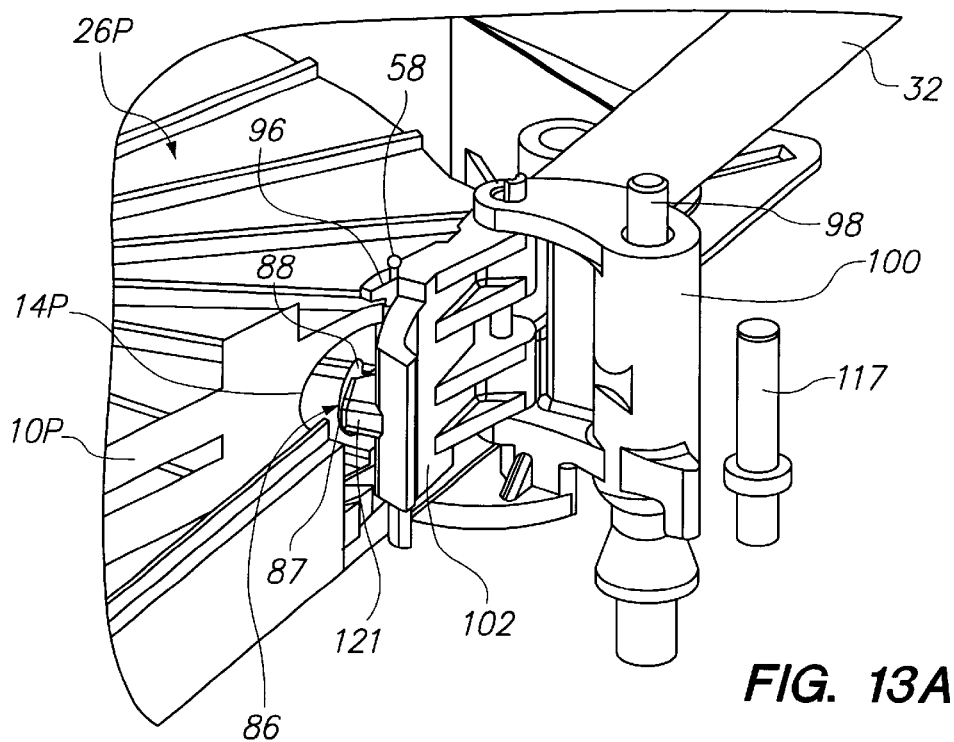
FIGS. 13A–13B illustrate a rear perspective view of the buckler, a portion of a cartridge, the drive leader and a cartridge leader during alternate stages of coupling.
Figure 13B:
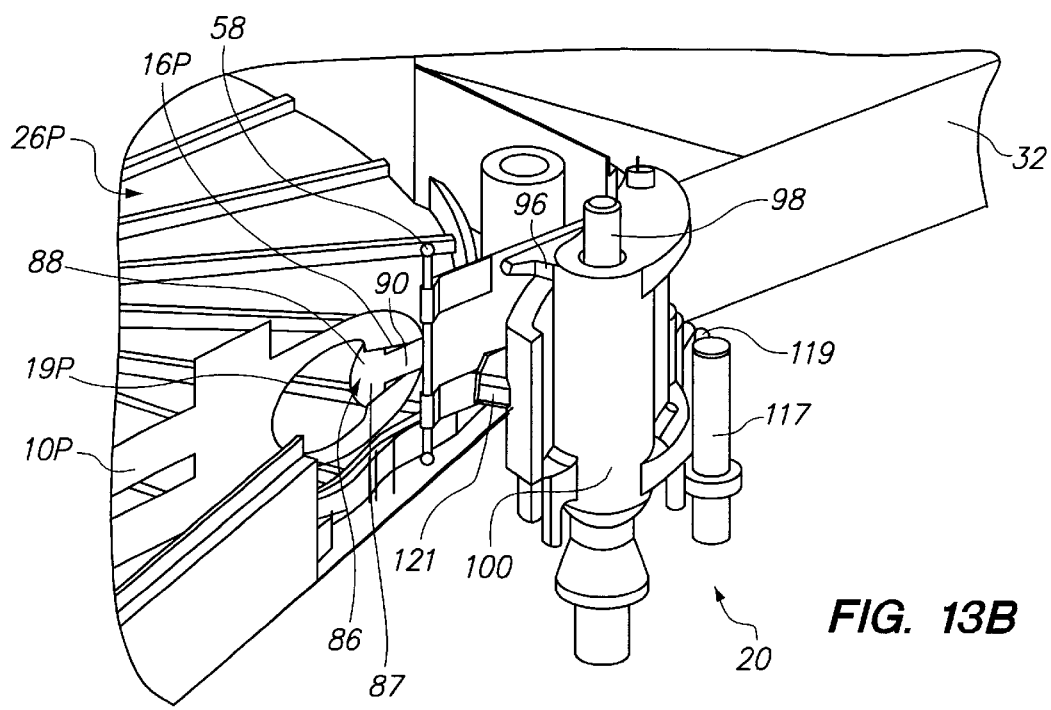

FIGS. 13A and 13B sequentially illustrate a rear perspective view of the first version of the buckler 20, a portion of a cartridge 22, the drive leader 32 and the cartridge leader 28 during buckling. In particular, FIGS. 13A and 13B illustrate that the alternate first buckle component 86 is used to couple the drive leader 32 to the cartridge leader 28. FIG. 13A highlights that the protrusion 121 supports the nose 88 of additional buckle component 86. This allows the nose 88 to fit within the hoop 51A of the prior art cartridge leader 28 when the cartridge 22 is inserted into the cartridge receiver 18. Subsequently, as illustrated in FIG. 13B, the buckler tab 119 of the buckler 20 is rotated against the buckler stop 117. This causes the second component 102 to rotate towards the first component 100 and move out of the way of the path of the storage tape 26.

As discussed above, rotation of the buckler 20 causes the buckler 20 to couple and decouple the drive leader 32 to the cartridge leader 28. In the embodiments illustrated in the Figures, the buckler 20 is rotated around the buckler pin 98 by a buckler motor 132 (illustrated in FIG. 2). The design of the buckler motor 132 can be varied. For example, the buckler motor 132 illustrated is a small electric motor mounted to the drive housing 12.

In order to precisely move the buckler 20, the buckler motor 132 is mechanically linked to the buckler motor 132 with a gear train (not shown) and a load ring 134. Basically, the gear train includes a plurality of gears that reduce rotation in the load ring 134 relative to the rotation of the buckler motor 132. Thus, a relatively large amount of rotation in the buckler motor 132 is reduced by the gear train to a relatively small amount of rotation to the load ring 134. The load ring 134 is positioned below and rotates relative to the cartridge receiver 18.

FIGS. 14A–14D, illustrate the interaction between the load ring 134, the first version of the buckler 20, and the buckler stop 117 without the rest of the tape drive 10. The load ring 134 is coupled to the buckler 20 and the buckler motor 132, so that rotation of the buckler motor 132 results in rotation of the load ring 134 and the buckler 20 relative to the cartridge receiver 18. In the embodiment illustrated in FIGS. 14A–14D, the load ring 134 is disk shaped and includes a plurality of load ring teeth 136, and a ring cam 138, which are positioned around and extend away a circumference of the load ring 134. The load ring teeth 136 mesh with the teeth of the gear train so that rotation of the gear train results in rotation of the load ring 134.

Figure 14A:
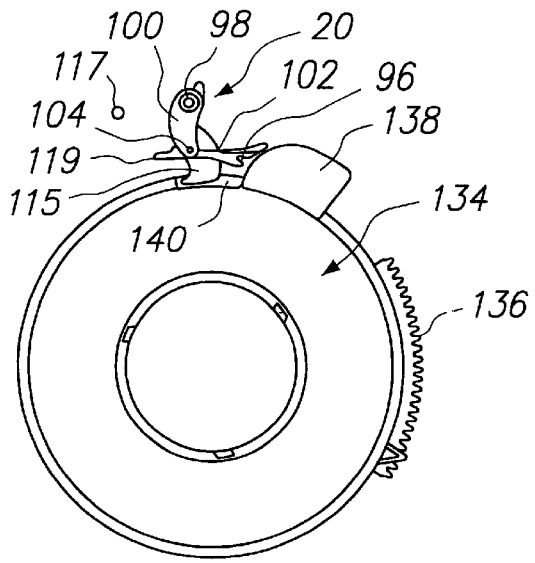
FIGS. 14A–14D illustrate the interaction between a load ring, a buckler and a buckler stop during alternate stages of coupling.
Figure 14B:
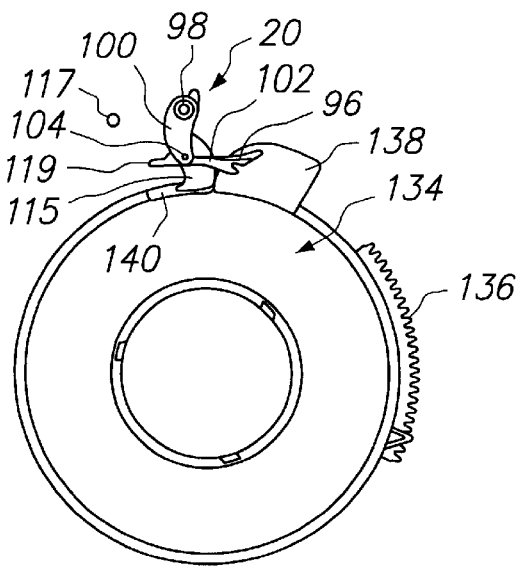
Figure 14C:
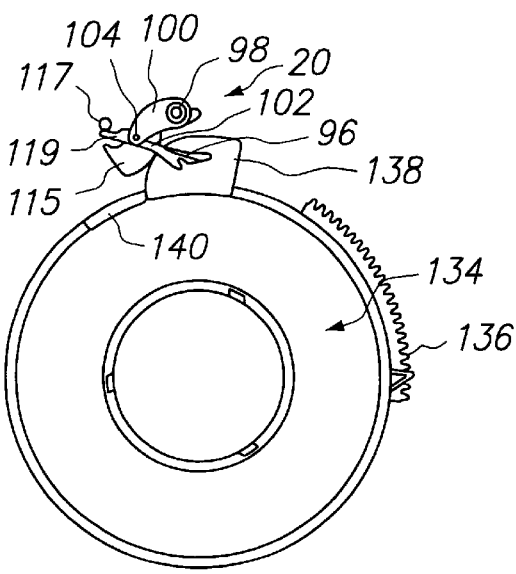
Figure 14D:
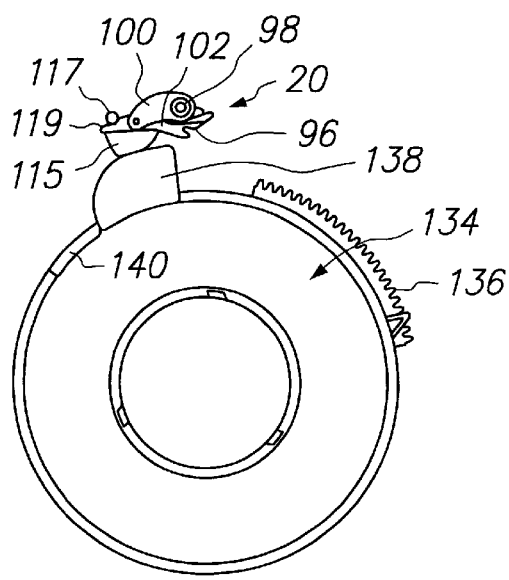
Figure 15A:
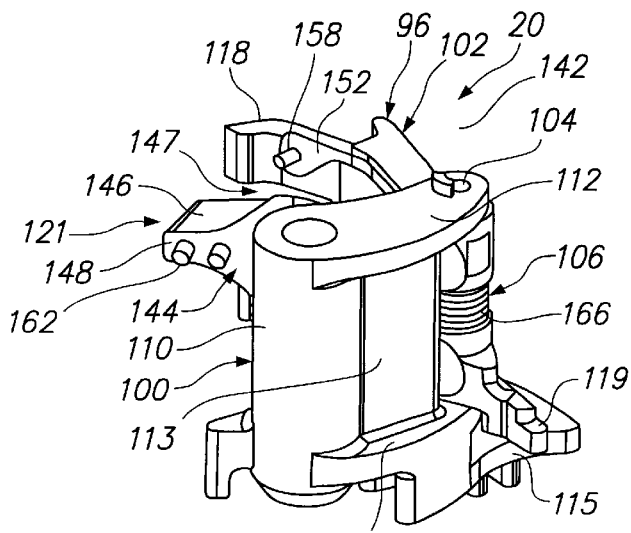
FIGS. 15A–15D illustrate perspective views of a second version of the buckler.
Figure 15B:
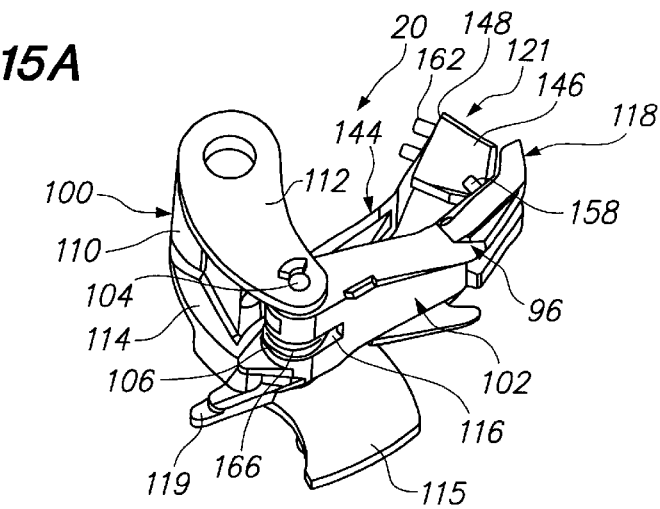
Figure 15C:
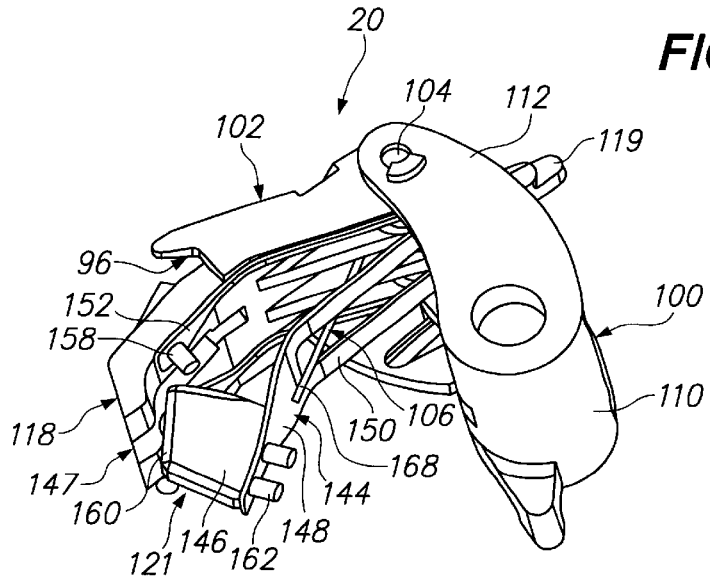
Figure 15D:
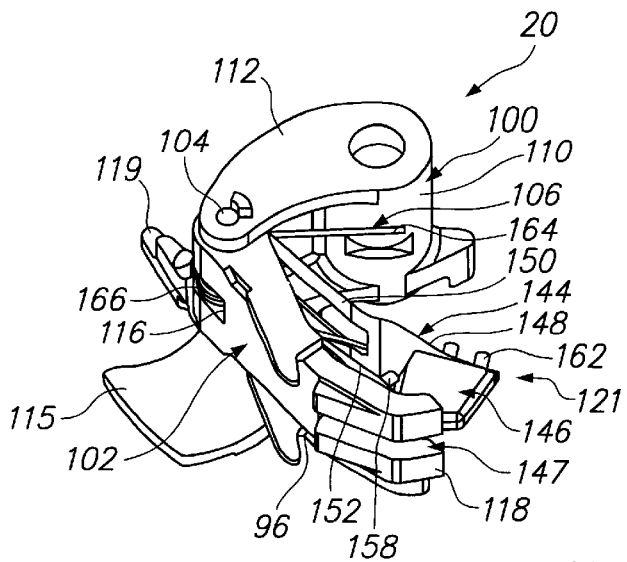

As illustrated in FIG. 14A, the buckler 20 is initially retained in a locked position by a lock notch 140 on the load ring 134. Additionally, in this position, the buckler spring 108 urges the first component 100 towards the load ring 134. Somewhat similarly, the connector spring 106 urges the second component 102 away from the buckler pin 98. Referring to FIGS. 14B–14D, rotation of the load ring 134 in the counter-clockwise direction results in interference between the ring cam 138 and the buckler cam 115 of the buckler 20. This causes rotation of the buckler 20 against the urging of the buckler spring 108 and engagement of the drive leader 32 and the cartridge leader 28. Additional rotation of the buckler 20 causes the buckler tab 119 to engage the buckler stop 117. This results in the second component of the buckler 20 rotating away from the buckle bar 58 and the second component 102 folding, against the urging of the connector spring 106 towards the first component 100.

Figure 16A:
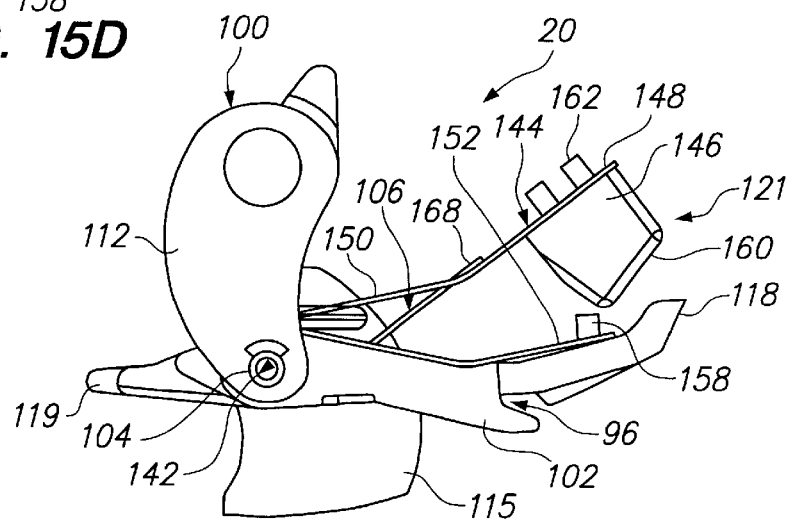
FIG. 16A illustrates a top plan view of the buckler of FIGS. 15A–15D.
Figure 16B:
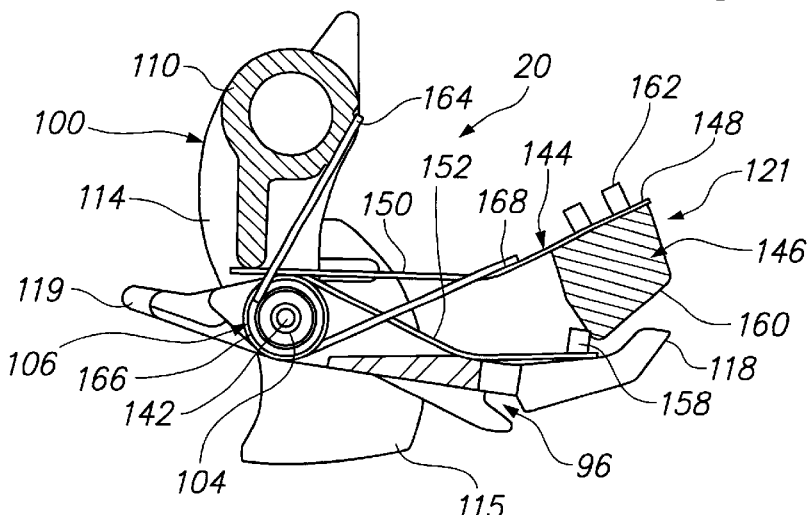
FIG. 16B illustrates a cross-sectional view of the buckler of FIGS. 15A–15D.
Figure 16C:
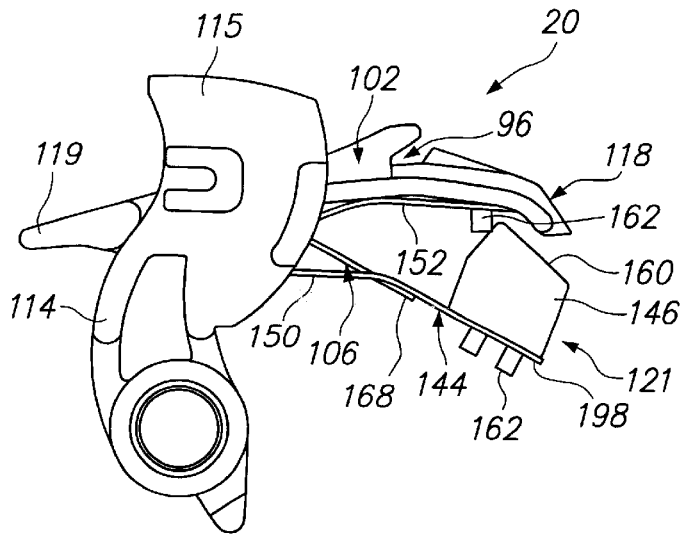
FIG. 16C illustrates a bottom plan view of the buckler of FIGS. 15A–15D.

FIGS. 15A–16C illustrate a second version of a buckler 20 having features of the present invention. More specifically, FIGS. 15A–15D illustrate alternate perspective views of the second version of the buckler 20, FIG. 16A illustrates a top plan view of the second version of the buckler 20, FIG. 16B illustrates a cross-sectional view of the second version of the buckler 20 and FIG. 16C illustrates a bottom plan view of the second version of the buckler 20.

The second version of the buckler 20 is somewhat similar to the first version of the buckler 20 described above and illustrated in FIGS. 7A–14D. However, in the second version, the deflector 121 is separate from and moves relative to the second component 102. Thus, with this design, the deflector 121 is able to selectively deflect a portion of the drive leader 32 during buckling to increase the reliability of buckling with some types of cartridge leaders 28. Importantly, the deflector 121 only deflects a portion of the drive leader 32 during buckling. In this design, the deflector 121 selectively deflects the tab 87 to fit within the hoop 51A during buckling.

Alternately, if a portion of the drive leader 32 is flexed at all times, then that portion of the drive leader 32 may take a permanent set. As a result thereof, the drive leader 32 may have difficulty passing along the tape path to the take-up reel 16. Further, this may weaken drive leader 32.

As an overview, the second component 102 and the buckler retainers 96 move relative to the deflector 121 to pull the drive leader 32 against the deflector 121. Further, the second component 102, the buckler retainers 96 and the deflector 121 each pivot relative to the first component 100 on a pivot axis 142. Stated another way, the second component 102 and the buckler retainers 96 initially pivot relative to the pivot axis 142 at a different rate than the deflector 121. In the second version of the buckler 20, the pivot axis 142 extends through the connector pin 104.

In the second version, the deflector 121 includes a deflector attacher 144, and a bumper 146 that extends away from the deflector attacher 144. Further, the second component 102 includes a rectangular shaped deflector slot 147 that provides space for the bumper 146 to pass through the second component 102.

Figure 17:
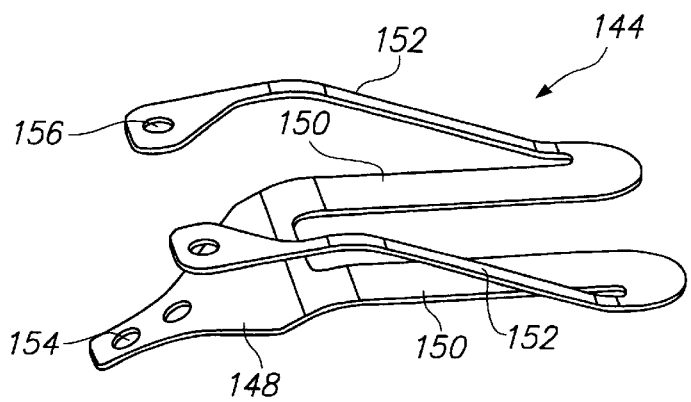
FIG. 17 illustrates a perspective view of a deflector attacher having features of the present invention.

The deflector attacher 144 attaches the bumper 146 to the second component 102 of the buckler 20. Further, the deflector attacher 144 allows the buckler retainers 96 to pivot relative to the bumper 146. FIG. 17 illustrates a perspective view of a deflector attacher 144 having features of the present invention. In this embodiment, the deflector attacher 144 includes a bumper attachment area 148, a pair of spaced apart, extension members 150 and a pair of spaced apart, attachment members 152.

The bumper attachment area 148 is somewhat triangular shaped and includes a couple of bumper apertures 154 for securing the bumper 146 to the bumper attachment area 148. Each of the extension members 150 is flat beam shaped and cantilevers away from the bumper attachment area 148. Each of the attachment members 152 is flat and cantilevers away from one of the extension members 150 towards the bumper attachment area 148. Each attachment member 152 includes an attachment aperture 156 for securing the deflector attacher 144 to the second component 102. Referring to FIGS. 15A–16C, the deflector attacher 144 can be secured to the second component 102 with a pair of attachment pins 158.

Preferably, the deflector attacher 144 is made of a resilient material such as spring steel. The deflector attacher 144 illustrated in the figures is preferably formed so that the bumper 146 extends almost between the attachment members 152 when the deflector attacher 144 is relaxed.

The bumper 146 is secured to and extends away from the bumper attachment area 148 of the deflector attacher 144. The bumper 146 is positioned to selectively extend through the deflector slot 147 in the second component 102. In the embodiment illustrated in FIGS. 15A–16C, the bumper 146 includes a ramped engagement surface 160. The engagement surface 160 engages the drive leader 32. The bumper 146 can be attached to the bumper attachment area 148 with a pair of bumper attachment pins 162.

Figure 18A:
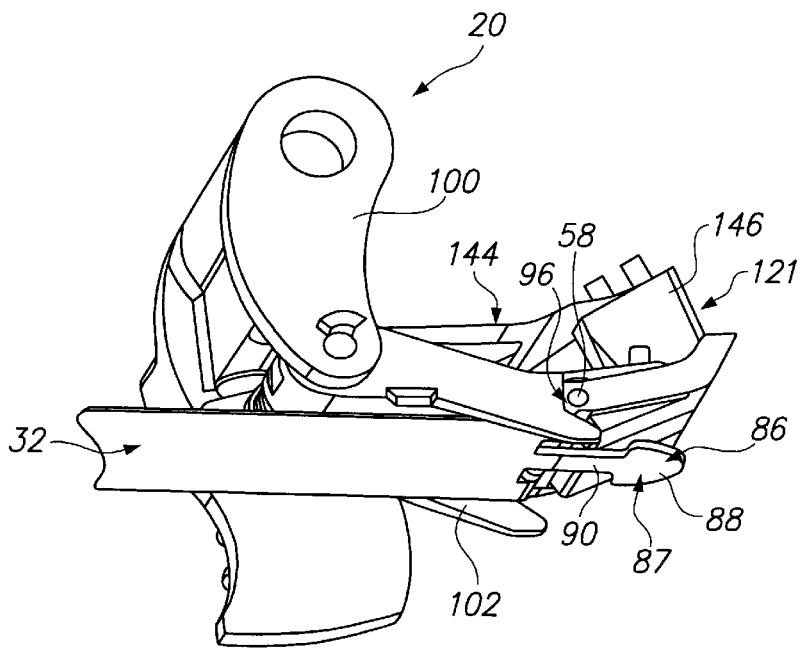
FIG. 18A illustrates a front perspective view of the buckler of FIGS. 15A–15D retaining a leader.
Figure 18B:
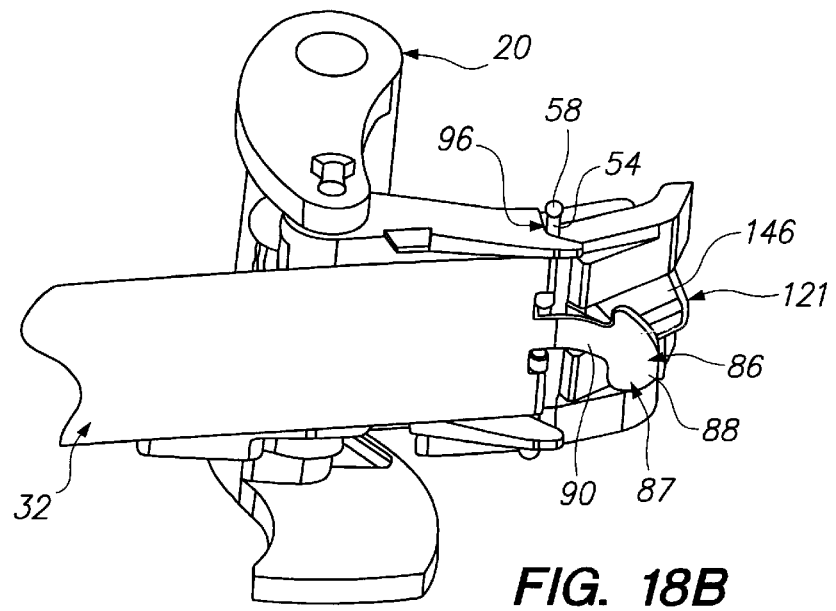
FIG. 18B illustrates a front perspective view of the buckler and leader of FIG. 18A with the buckler slightly rotated.

It should be noted in this embodiment of the buckler 20, that the connector spring 106 engages the first component 100 and the deflector 121. More specifically, the connector spring 106 is a coiled spring having a first end 164 that engages the tube shaped section 110, a coiled center 166 that encircles the connector pin 104, and a second end 168 that engages the back of the bumper attachment area 148. The connector spring 106 is biased to urge the bumper 146 to rotate relative to second component 102 and the first component 100 in a clockwise direction away from the buckler pin 98. Stated another way, the connector spring 106 is biased to inhibit the deflector 121 and the second component 102 from folding towards the first component 100. Importantly, the cooperation between the connector spring 106 and the deflector attacher 144 allows the deflector 121 to initially pivot at a different rate than the second component 102. The interaction of the components of the second version of the buckler 20 can probably best be understood with reference to FIGS. 18A–19D. In particular, FIG. 18A illustrates a perspective view of the buckler 20 and the drive leader 32 with deflector 121 not bending the tab 87 and FIG. 18B illustrates a perspective view of the buckler 20 and the drive leader 32 with deflector 121 deflecting the tab 87.

Figure 19A:
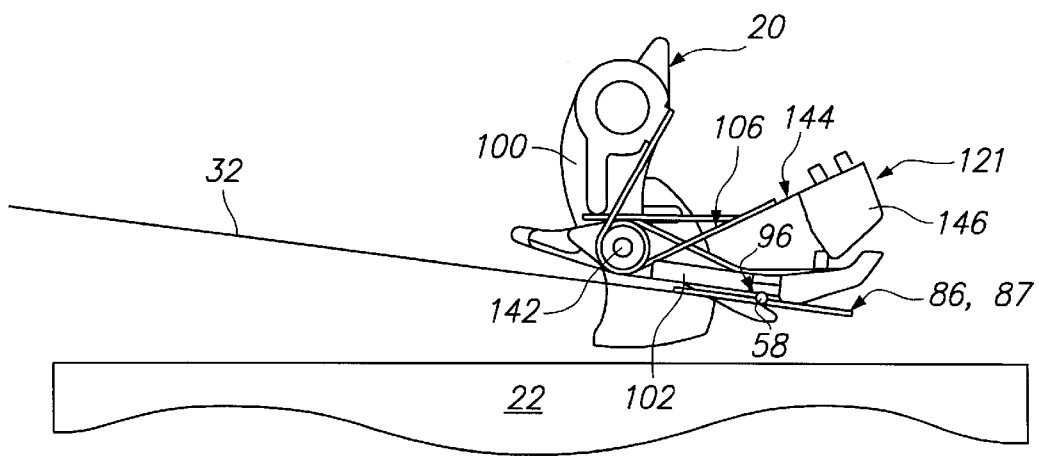
FIGS. 19A–19D illustrate a top plan view, in partial cut-away of the buckler, a portion of a cartridge, and a drive leader during alternate stages of coupling.
Figure 19B:
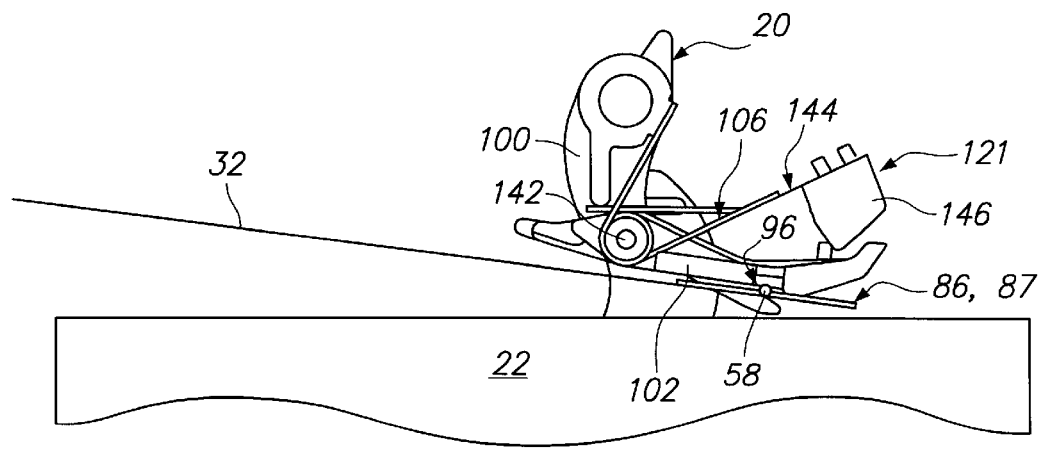
Figure 19C:
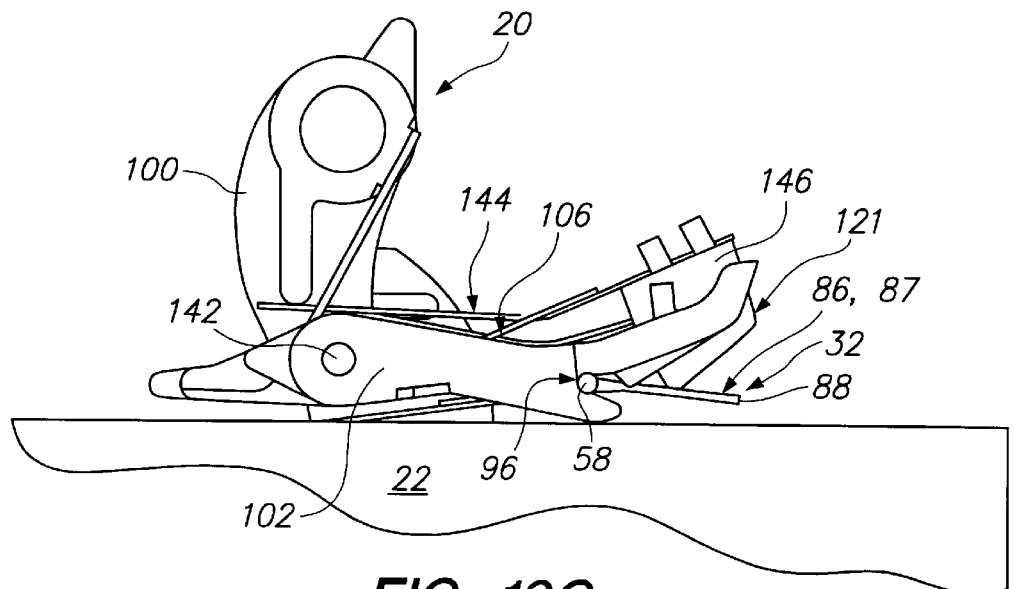
Figure 19D:
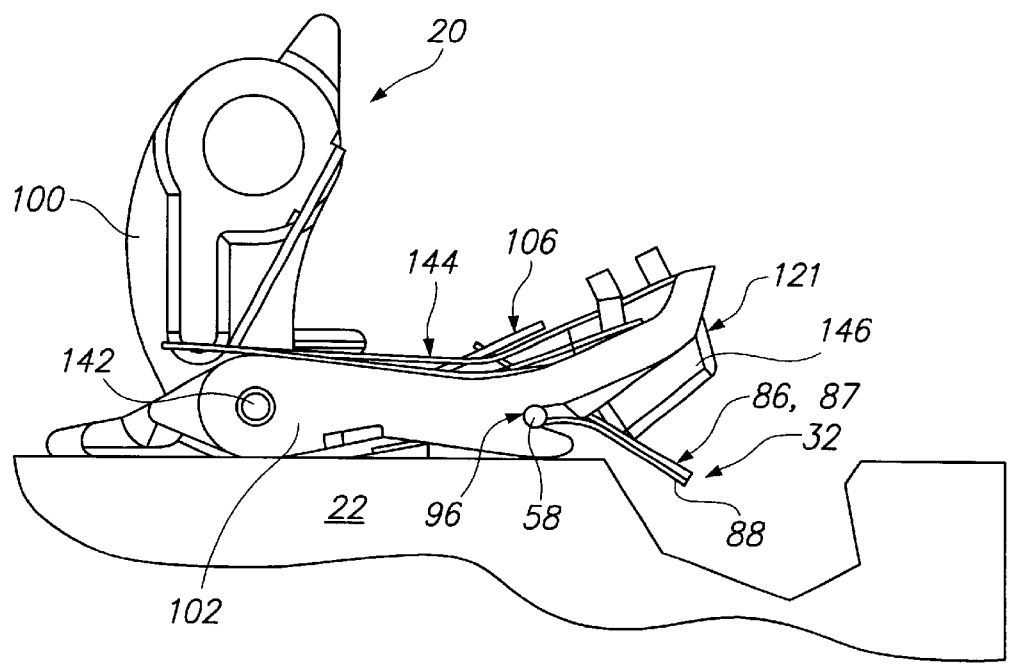

FIGS. 19A–19D illustrate the buckler 20, the drive leader 32 and the cartridge 22 during alternate stages of buckling. A portion of the first component 100 and the second component 102 of the buckler 20 in FIGS. 19A and 19B are removed to reveal the interaction of the connector spring 106 and the deflector attacher 144. Additionally, a portion of the first component 100 of the buckler 20 in FIGS. 19C and 19D is removed to reveal the interaction of the connector spring 106 and the deflector attacher 144.

In particular, FIG. 19A illustrates the buckler 20 retaining the drive leader 32 prior to the cartridge 26P being fully inserted into the tape drive 10 (not illustrated in FIG. 19A). At this stage, the deflector 121 is not bending the tab 87 of the drive leader 32. FIG. 19B illustrates the buckler 20 retaining the drive leader 32 with the cartridge 22 beginning to engage the second component 102 and the cartridge 22 still not fully inserted into the tape drive 10 (not illustrated in FIG. 19B). At this stage, the deflector 121 is still not bending the tab 87 of the drive leader 32.

FIG. 19C illustrates the buckler 20 retaining the drive leader 32 with the cartridge 22 partly engaging the second component 102 and the cartridge 22 still not fully inserted into the tape drive 10 (not illustrated in FIG. 19C). At this stage, the cartridge 22 pushes against the second component 102 and the buckler retainers 96 of the buckler 20. This causes the second component 102 and the buckler retainers 96 to rotate around the pivot axis 142 towards the deflector 121. At this stage, the deflector attacher 144 allows the second component 102 to move relative to the bumper 146. Further, the connector spring 106 urges the bumper 146 towards the cartridge 22. Importantly, the movement of the buckler retainers 96 pulls the drive leader 32 towards the bumper 146 and causes the bumper 146 to deflect the tab 87.

FIG. 19D illustrates the buckler 20 retaining the drive leader 32 with the cartridge 22 fully engaging the second component 102 and the cartridge 22 fully inserted into the tape drive 10 (not illustrated in FIG. 19D). At this stage, the cartridge 22 further pushes against the second component 102 and the buckler retainers 96. This causes the second component 102 and the buckler retainers 96 to rotate around the pivot axis 142 towards the deflector 121. At this stage, the deflector attacher 144 allows the second component 102 to move further relative to the bumper 146 and the connector spring 106 urges the bumper 146 towards the cartridge 22. Additionally, the movement of the buckler retainers 96 pulls the drive leader 32 towards the bumper 146 and causes the bumper 146 to fully deflect the tab 87. FIG. 19D highlights that the deflector 121 pushes the nose 88 of additional buckle component 86 towards the cartridge 22. This allows the nose 88 to fit within the hoop 51A of the cartridge leader 28 when the cartridge 22 is fully inserted into the cartridge receiver 18.

In summary, FIGS. 19A–19D highlight that the deflector 121 selectively deflects a portion of the drive leader 32 during buckling to increase the reliability of buckling with some types of cartridge leaders 28. In this design, the deflector 121 only deflects a portion of the drive leader 32 during buckling. More specifically, the deflector 121 selectively deflects the tab 87 to fit within the hoop 51A during buckling.

While the particular tape drive 12, and buckler 20 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape drive that is adapted for use with a cartridge, the cartridge including a storage tape having a cartridge leader, the tape drive comprising:
   a cartridge receiver that receives the cartridge;
   a take-up reel including a drive leader, the drive leader being adapted to engage the cartridge leader to couple the storage tape to the take-up reel; and
   a buckler including a buckler retainer and a deflector, the buckler retainer being adapted to selectively retain the drive leader to couple the drive leader to the cartridge leader, wherein the buckler retainer moves relative to the deflector to selectively deflect the drive leader.

2. The tape drive of claim 1 wherein the buckler retainer moves relative to the deflector to pull the drive leader against the buckler deflector.

3. The tape drive of claim 1 wherein the buckler retainer and the deflector each pivot relative to a pivot axis.

4. The tape drive of claim 3 wherein the buckler retainer initially pivots relative to the pivot axis at a different rate than the deflector.

5. The tape drive of claim 1 wherein the drive leader includes a tab that fits within a hoop in the cartridge leader and the deflector selectively deflects the tab to fit within the hoop during buckling.

6. The tape drive of claim 1 wherein the cartridge engages the buckler and causes the buckler retainer to move relative to the deflector upon insertion of the cartridge within the cartridge receiver.

7. A tape library including the tape drive of claim 1.

8. A tape drive adapted for use with a cartridge, the cartridge including a storage tape having a cartridge leader, the tape drive comprising:
   a cartridge receiver that receives the cartridge;
   a take-up reel;
   a drive leader connected to the take-up reel, drive leader including a buckle bar and a tab; and
   a buckler including a buckler retainer and a deflector, the buckler retainer being adapted to selectively retain the buckle bar to move the drive leader relative to the cartridge leader, the deflector being adapted to selectively deflect the tab towards the cartridge receiver.

9. The tape drive of claim 8 wherein the buckler retainer moves relative to the deflector to pull the drive leader against the buckler deflector.

10. The tape drive of claim 8 wherein the buckler retainer and the deflector each pivot relative to a pivot axis and the buckler retainer initially pivots relative to the pivot axis at a different rate than the deflector.

11. The tape drive of claim 8 wherein the cartridge engages the buckler and causes the buckler retainer to move relative to the deflector upon insertion of the cartridge within the cartridge receiver.

12. The tape drive of claim 8 wherein the buckler includes a deflector attacher that connects the deflector and the buckler retainer and allows the buckler retainer to pivot relative to the deflector.

13. A tape library including the tape drive of claim 8.

14. A method for buckling a cartridge leader of a cartridge to a tape drive, the method comprising the steps of:
   providing a tape drive including a cartridge receiver, a take-up reel, and a buckler, the cartridge receiver being adapted to receive the cartridge, the take-up reel including a drive leader that engages the cartridge leader to couple the cartridge leader to the take-up reel, the buckler including a buckler retainer and a deflector, the buckler retainer selectively retaining the drive leader; and
   selectively deflecting the drive leader by moving the buckler retainer relative to the deflector.

15. The method of claim 14 including the step of moving the buckler retainer relative to the deflector to pull the drive leader against the buckler deflector.

16. The method of claim 14 including the step of pivoting the buckler retainer and the deflector relative to a pivot axis, wherein the buckler retainer initially pivots relative to the pivot axis at a different rate than the deflector.

17. The method of claim 14 including the step of connecting the deflector to the buckler retainer with a deflector attacher that allows the buckler retainer to pivot relative to the deflector.

18. A tape drive that is adapted for use with a cartridge, the cartridge including a storage tape having a cartridge leader, the tape drive comprising:
   a cartridge receiver that receives the cartridge;
   a take-up reel including a drive leader, the drive leader being adapted to engage the cartridge leader to couple the storage tape to the take-up reel; and
   a buckler including a buckler retainer and a deflector, the buckler retainer being adapted to selectively retain the drive leader to couple the drive leader to the cartridge leader, the deflector being adapted to selectively deflect the drive leader, wherein the buckler includes a buckler tab which interacts with the buckler stop and causes the buckler and the deflector to rotate away from the drive leader.

19. The tape drive of claim 18 wherein the buckler retainer and the deflector each pivot and wherein the buckler retainer initially pivots relative to the pivot axis at a different rate than the deflector.

20. The tape drive of claim 18 wherein the drive leader includes a tab that fits within a hoop in the cartridge leader and the deflector selectively deflects the tab to fit within the hoop during buckling.

21. The tape drive of claim 18 wherein the cartridge engages the buckler and causes the buckler retainer to move relative to the deflector upon insertion of the cartridge within the cartridge receiver.

22. The tape drive of claim 18 wherein the drive leader includes a bar shaped buckle bar and the buckler retainer selectively retains the buckle bar.

23. The tape drive of claim 18 wherein the buckler includes a deflector attacher that connects the deflector and the buckler retainer and allows the buckler retainer to pivot relative to the deflector.

24. A tape library including the tape drive of claim 18.

25. A tape drive that is adapted for use with a cartridge, the cartridge including a storage tape having a cartridge leader, the tape drive comprising:

a cartridge receiver that receives the cartridge;

a take-up reel including a drive leader, the drive leader being adapted to engage the cartridge leader to couple the storage tape to the take-up reel, drive leader including a bar shaped buckle bar; and a buckler including a buckler retainer and a deflector, the buckler retainer being adapted to selectively retain the buckle bar and the drive leader to couple the drive leader to the cartridge leader, the deflector being adapted to selectively deflect the drive leader.

26. The tape drive of claim 25 wherein the buckler retainer and the deflector each pivot and wherein the buckler retainer initially pivots at a different rate than the deflector.

27. The tape drive of claim 25 wherein the drive leader includes a tab that fits within a hoop in the cartridge leader and the deflector selectively deflects the tab to fit within the hoop during buckling.

28. The tape drive of claim 25 wherein the cartridge engages the buckler and causes the buckler retainer to move relative to the deflector upon insertion of the cartridge within the cartridge receiver.

29. The tape drive of claim 25 including a buckler stop secured to the tape drive; wherein the buckler includes a buckler tab which interacts with the buckler stop and causes the buckler and the buckler deflector to rotate away from the drive leader.

30. The tape drive of claim 25 wherein the buckler includes a deflector attacher that connects the deflector and the buckler retainer and allows the buckler retainer to pivot relative to the deflector.

31. A tape library including the tape drive of claim 25.

32. A tape drive that is adapted for use with a cartridge, the cartridge including a storage tape having a cartridge leader, the tape drive comprising:

a cartridge receiver that receives the cartridge;

a take-up reel including a drive leader, the drive leader being adapted to engage the cartridge leader to couple the storage tape to the take-up reel; and a buckler including a buckler retainer, a deflector and a deflector attacher, the buckler retainer being adapted to selectively retain the drive leader to couple the drive leader to the cartridge leader, the deflector being adapted to selectively deflect the drive leader, wherein the deflector attacher connects the deflector and the buckler retainer and allows the buckler retainer to pivot relative to the deflector.

33. The tape drive of claim 32 wherein the buckler retainer initially pivots relative to the pivot axis at a different rate than the deflector.

34. The tape drive of claim 32 wherein the drive leader includes a tab that fits within a hoop in the cartridge leader and the deflector selectively deflects the tab to fit within the hoop during buckling.

35. The tape drive of claim 32 wherein the cartridge engages the buckler and causes the buckler retainer to move relative to the deflector upon insertion of the cartridge within the cartridge receiver.

36. The tape drive of claim 32 including a buckler stop secured to the tape drive; wherein the buckler includes a buckler tab which interacts with the buckler stop and causes the buckler and the buckler deflector to rotate away from the drive leader.

37. The tape drive of claim 32 wherein the drive leader includes a bar shaped buckle bar and the buckler retainer selectively retains the buckle bar.

38. A tape library including the tape drive of claim 32.

\* \* \* \* \*